United States Patent
Ward

[11] 3,917,014
[45] Nov. 4, 1975

[54] HYDROSTATIC DRIVING AND STEERING TRANSMISSION

[75] Inventor: Harold R. Ward, Marshall, Mich.

[73] Assignee: Eaton Corporation, Cleveland, Ohio

[22] Filed: Apr. 28, 1972

[21] Appl. No.: 248,498

[52] U.S. Cl. ............................ 180/6.48; 60/484
[51] Int. Cl.² ................................ B60D 11/04
[58] Field of Search .......... 180/6.48; 60/484, 440

[56] References Cited
UNITED STATES PATENTS

| | | | |
|---|---|---|---|
| 2,318,962 | 5/1943 | Parker | 137/513.3 |
| 3,727,402 | 4/1973 | Keith | 180/6.48 |

Primary Examiner—Kenneth H. Betts
Assistant Examiner—John A. Pekar
Attorney, Agent, or Firm—Teagno & Toddy

[57] ABSTRACT

A pair of improved valves are utilized in a drive system as steering control valves to regulate the operation of a pair of hydrostatic transmissions which are driven by a common engine or prime mover and are drivingly connected with different tracks of a vehicle. The displacement and input to output speed ratios of the hydrostatic transmissions are simultaneously varied by operating a single speed control valve to port control fluid to pressure responsive actuator assemblies which are operable to vary the effective displacement of the hydrostatic transmissions. Upon operation of one of the steering control valves, the actuator assembly of an associated hydrostatic transmission is activated to vary the output speed of the associated hydrostatic transmission and the speed at which one of the tracks of the vehicle is driven. Flow control assemblies are associated with the steering control valves to enable one of the steering valves to be actuated to vary the input to output speed ratio of the associated hydrostatic transmission while maintaining the input to output speed ratio of the other hydrostatic transmission constant. Each of the flow control assemblies includes an orifice for restricting fluid flow to the associated actuator assembly and a check valve which enables fluid to flow in an unrestricted manner from the associated actuator assembly. In one specific preferred embodiment, each of the steering control valves has more than 75% of its effective operating range between an initial condition in which the hydrostatic transmissions are operated at the same speed and a dead track condition in which the associated one of the hydrostatic transmissions is ineffective to drive a track of the vehicle.

17 Claims, 11 Drawing Figures

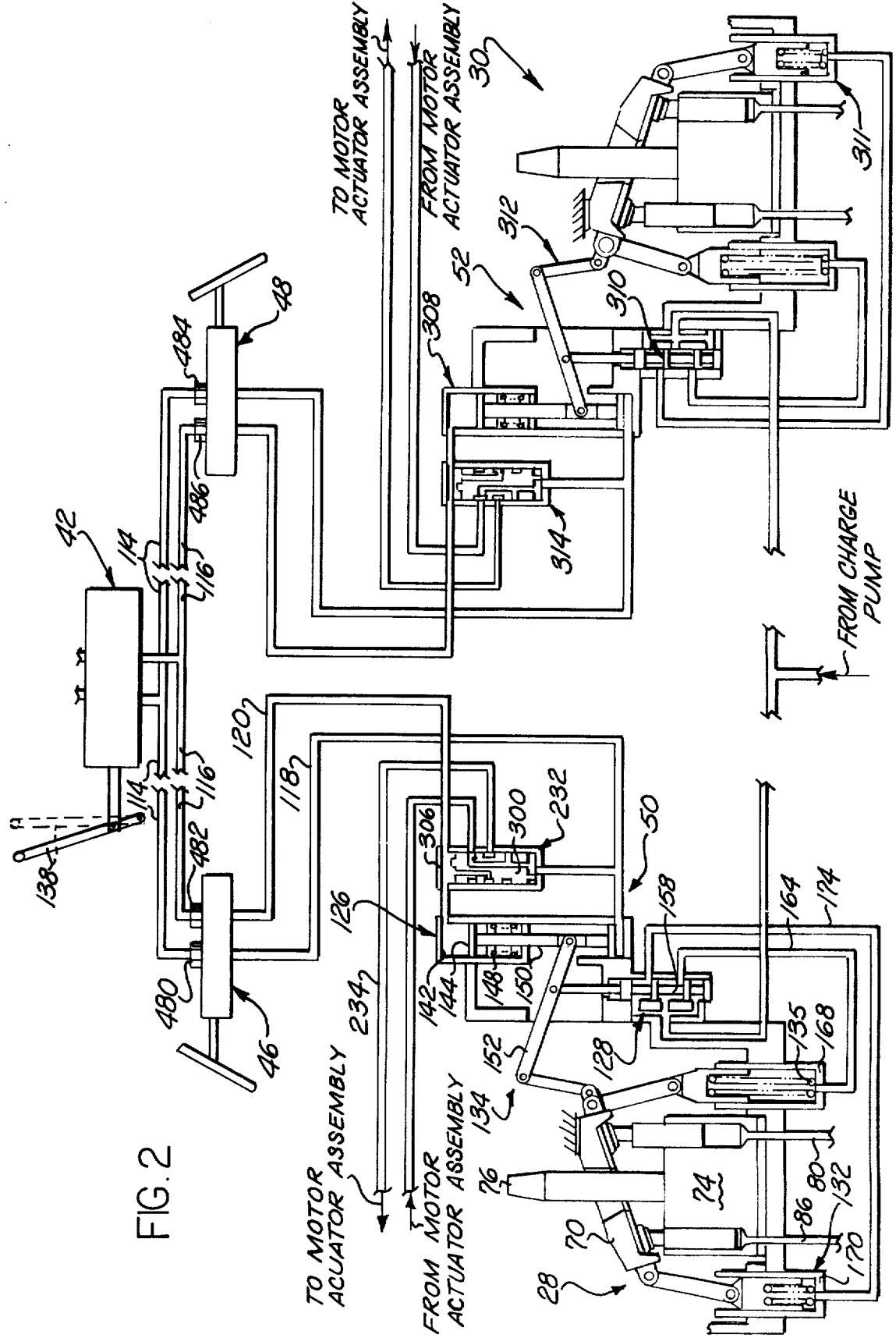

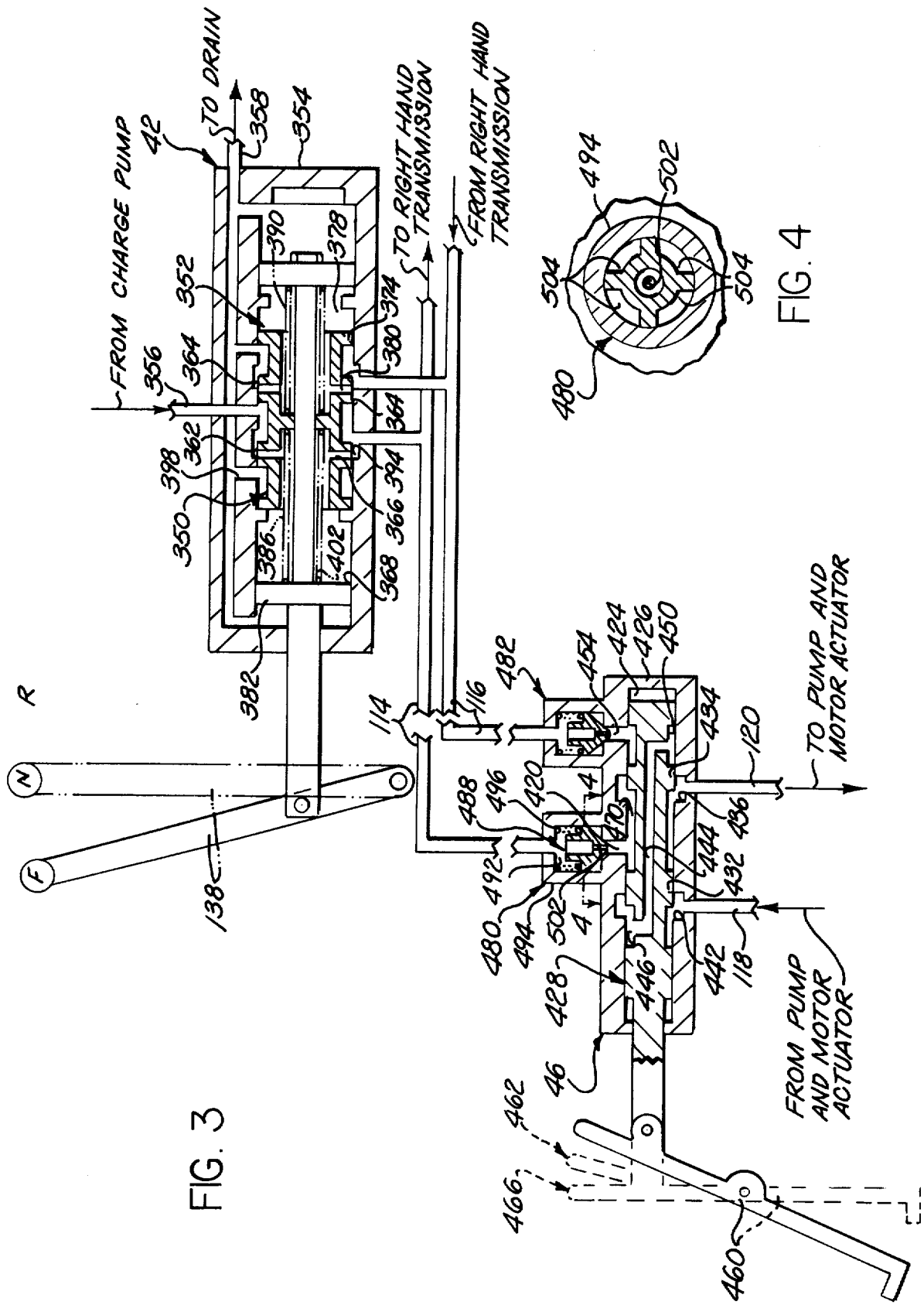

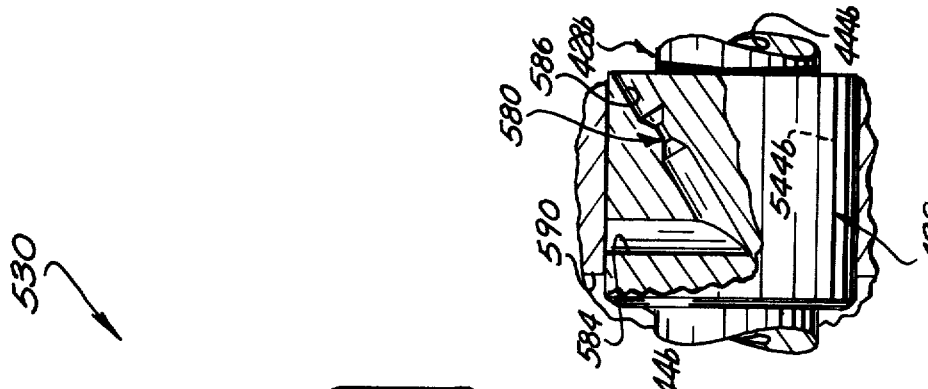
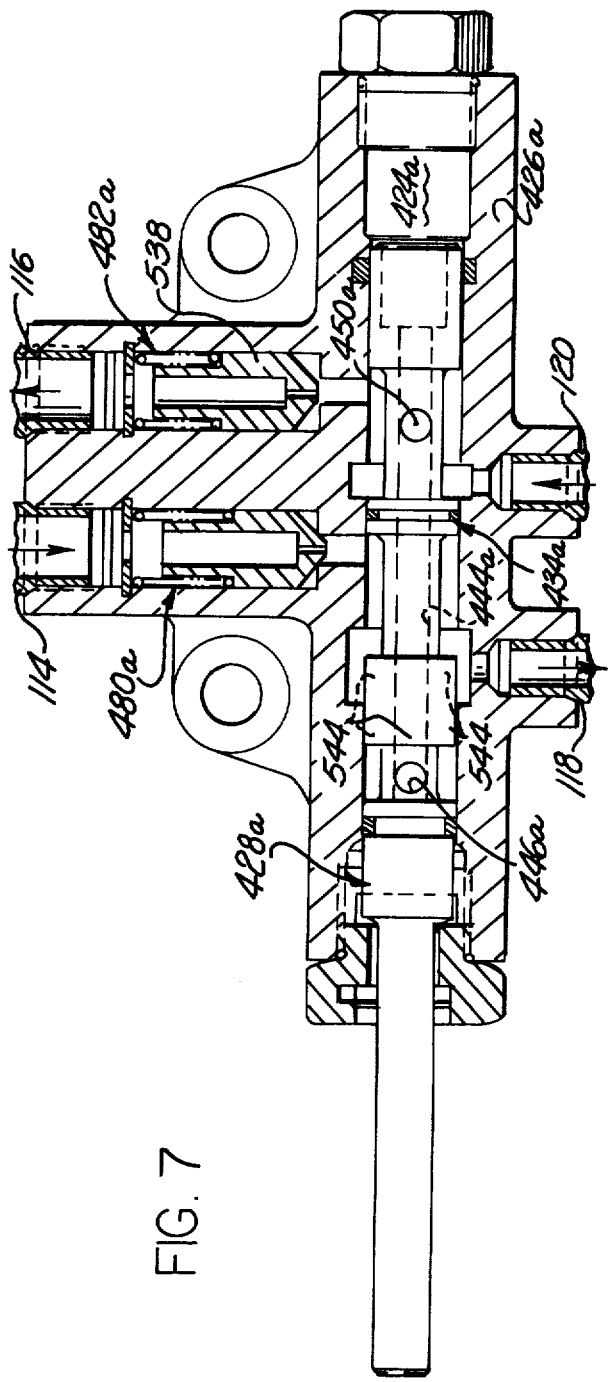
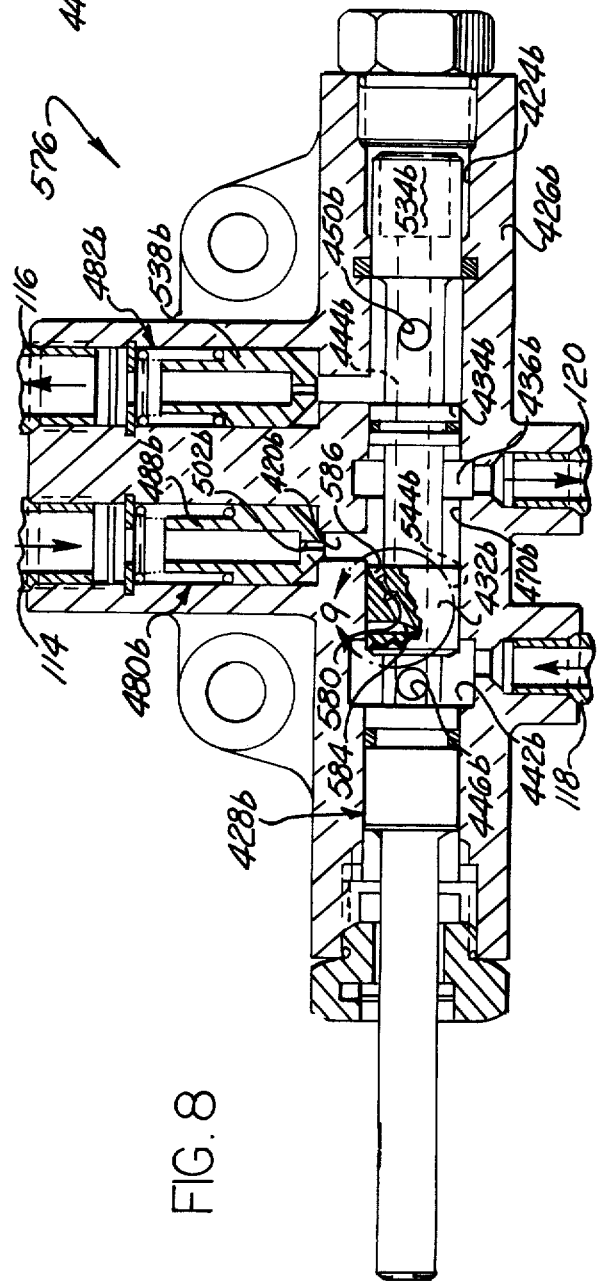

HYDROSTATIC DRIVING AND STEERING TRANSMISSION

BACKGROUND OF THE INVENTION

This invention relates generally to an improved contol valve and more particularly to a control valve arrangement for controlling the operation of a hydrostatic transmission drive system.

A known hydrostatic transmission drive system includes a pair of hydrostatic transmissions which are utilized to vary the drive ratio between an engine or prime mover and the tracks or wheels of a vehicle. A speed or master control valve is selectively actuatable to vary control fluid pressure which is conducted to pressure responsive actuator assemblies associated with the hydrostatic transmissions to simultaneously vary the input to output speed ratios of the hydrostatic transmissions and the speed at which the vehicle moves over the ground. Steering control valves are associated with the hydrostatic transmissions to effect separate operation of the actuator assemblies to vary the input to output speed ratios of the associated hydrostatic transmissions and a turning of the vehicle. Once such control system is disclosed in U.S. Pat. application Ser. No. 158,455, filed June 30, 1971 by Errol W. Keith et al for Hydrostatic Transmission Speed and Steering Control System now U.S. Pat. No. 3,727,402.

If the steering control valves are connected in fluid communication with each other by conduits which conduct control fluid to and from the speed control valve, actuation of one of the steering control valves may, under certain circumstances, result in an excessive flow of control fluid and a decrease in the fluid pressure conducted to the actuator assembly associated with the other hydrostatic transmission. Such a reduction in control fluid pressure could effect operation of the actuator assembly associated with the other hydrostatic transmission so that the output speed of both of the hydrostatic transmissions would be changed upon actuation of only one of the steering control valves.

When a steering control valve is actuated, the output speed of the associated hydrostatic transmission and the speed at which the associated track of the vehicle is driven are decreased to effect a turning of the vehicle. As actuation of the steering control valve is continued, it is desirable to have the turning radius of the vehicle decrease in a manner which is a linear function of the extent to which the steering valve is actuated. Also, as the steering valve is actuated through more than 75% of its total operating range, it is desirable to have the turning radius of the vehicle decrease to a dead track condition in which the vehicle is turning around one of its tracks. In addition, it is desirable to have initial actuation of the steering control valve result in a very large change in the turning radius so as to prevent a dead pedal sensation to an operator as the vehicle turns about an extremely large turning radius.

When the control fluid pressure conducted to an actuator assembly for the hydrostatic transmission is varied by a steering control valve in the manner disclosed in U.S. Pat. No. 3,528,243, the turning radius changes from an initial condition to a dead track condition in about 61% of the total operating range of the valve. Continued actuation of the valve through the remaining 39% of its operating range results in the track be driven in a reverse direction to spin the vehicle. It has been determined that a steering control valve should be actuated through more than 75% of its operating range to change the turning radius of the vehicle from an initial condition to a dead track condition in such a manner as to tend to optimize operator control of the vehicle.

SUMMARY OF THE PRESENT INVENTION

The present invention relates to a control apparatus which may be used in connection with a hydrostatic transmission drive system. More specifically, the present invention provides a flow control apparatus which restricts the flow of control fluid from steering valves to actuator assemblies for a pair of hydrostatic transmissions. The flow control apparatus enables the steering control valve associated with one of the hydrostatic transmissions to be actuated without reducing the control fluid pressure which is transmitted to the actuator assembly for the other hydrostatic transmission. The flow control apparatus includes a check valve and bypass arrangement which restricts fluid flow to the actuator assemblies and enables fluid to flow in an unrestricted manner from the actuator assemblies.

In one specific preferred embodiment of the invention, a steering control valve is constructed so as to effect operation of the actuator assembly for the associated hydrostatic transmission to vary the turning radius as a function of variations in the extent of operation of the steering valve as it is actuated through the operating range. At the beginning of the valve operating range the tracks of the vehicle are driven at the same speed. After the valve has been operated through more than 75% and preferably through 90% of its operating range, an associated hydrostatic transmission is ineffective to drive a track of the vehicle so as to provide dead track turning of the vehicle. Control of the vehicle by an operator is substantially facilitated by varying the turning radius as a linear function of the extent of operation of the steering valve as the turning radius decreases from a radius of more than twenty feet to a radius of approximately ten feet.

Accordingly, it is an object of this invention to provide a new and improved apparatus for controlling operation of a plurality of hydrostatic transmissions and including steering control valves each of which is separately actuatable to vary the displacement of an associated hydrostatic transmission while maintaining the displacement of the other hydrostatic transmission constant.

Another object of this invention is to provide a new and improved apparatus for controlling the operation of a plurality of hydrostatic transmissions for driving tracks of a vehicle and which includes separate steering control valves for varying the output speed of an associated one of the hydrostatic transmission and wherein each of the steering control valves is operable to vary the turning radius of the vehicle as a function of variations in the extent of operation of the steering control valve as it is operated through an effective operating range having at least 75% of its extent between an initial condition and a dead track condition in which the associated hydrostatic transmission is ineffective to drive a track of the vehicle.

Another object of this invention is to provide a new and improved control valve assembly for varying control fluid pressure conducted to a pressure responsive device and wherein a first orifice restricts fluid flow to the control valve assembly and a second orifice in the control valve assembly is operable to modulate a flow of control fluid from the control valve assembly to the pressure responsive device.

Another object of this invention is to provide a new and improved apparatus for controlling operation of a plurality of hydrostatic transmissions having actuator assemblies which are operable to vary the output speeds of the hydrostatic transmissions and a control valve assembly for varying the control fluid pressure conducted to one of the actuator assemblies and for maintaining the control fluid pressure conducted to the other actuator assembly substantially constant to thereby enable the displacement of one hydrostatic transmission to be varied while maintaining the displacement of the other hydrostatic transmission constant and wherein this control valve assembly includes an orifice which restricts fluid flow to the associated actuator assembly and a bypass arrangement for enabling fluid to flow from the associated actuator assembly in an unrestricted manner.

DESCRIPTION OF THE DRAWINGS

The foregoing and other objects and features of the invention will become more apparent upon a consideration of the following description taken in connection with the accompanying drawings wherein:

FIG. 2 is a schematic illustration depicting the relationship between a master or speed control valve, a pair of steering valves constructed in accordance with the present invention, and pump units of a pair of hydrostatic transmissions which are utilized to drive tracks of the vehicle of FIG. 1;

FIG. 3 is an anlarged schematic illustration depicting the relationship between the speed control valve and one of the steering control valves of FIG. 2;

FIG. 4 is a schematic fragmentary illustration taken along the line 4—4 of FIG. 3, illustrating the construction of a combination check valve and orifice assembly;

FIG. 7 is a sectional view, similar to FIGS. 5 and 6 of the steering control valve in a fully actuated position in which the associated hydrostatic transmission is effective to drive a track of the vehicle in a direction which is opposite the direction at which the other track of the vehicle is being driven;

FIG. 8 is a sectional view, similar to FIGS. 5–7, of an embodiment of a steering control valve which is operable to vary the turning radius of the associated vehicle as a linear function of extent of operation of the steering control valve during a major portion of its range of actuation;

FIG. 9 is an enlarged fragmentary sectional view of the area indicated generally by the arrows 9—9 in FIG. 8, illustrating the construction of an orifice in a spool of a steering valve to provide a nonlinear relationship between variations in control fluid pressure and variations in the extent of operation of the steering control valve;

DESCRIPTION OF ONE PREFERRED EMBODIMENT

Figure 1:
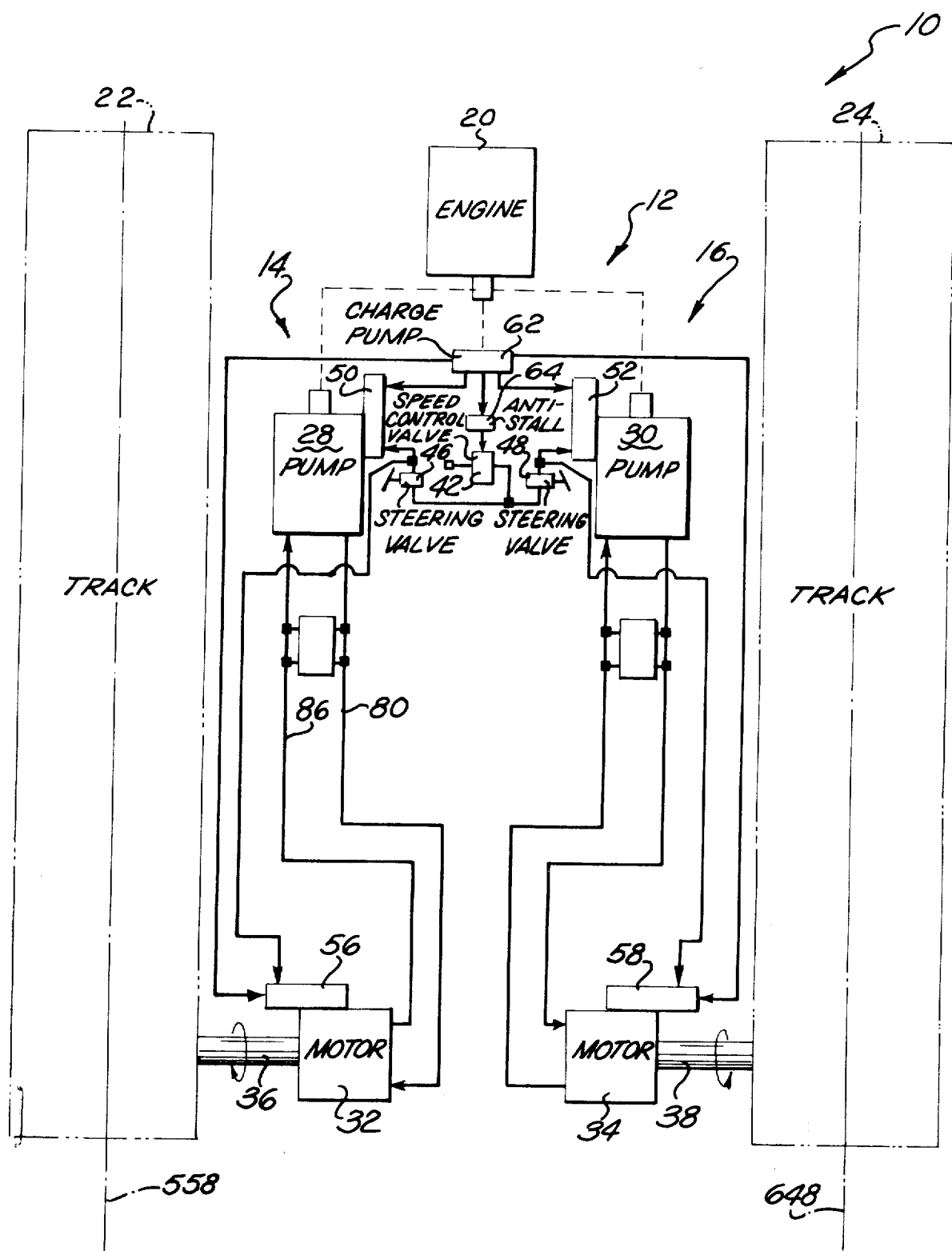
FIG. 1 is a schematic illustration of a tracked vehicle having a hydrostatic transmission drive system constructed in accordance with the present invention.

General Description:

A vehicle 10 having a hydrostatic transmission drive system 12 is illustrated in FIG. 1. The hydrostatic transmission drive system 12 includes left and right hand hydrostatic transmissions 14 and 16 which transmit drive forces from a common engine or prime mover 20 to left and right tracks 22 and 24 of the vehicle 10. The hydrostatic transmissions 14 and 16 include variable displacement pump units 28 and 30 which are driven by the engine 20 to transmit fluid under pressure to variable displacement motor units 32 and 34 which are drivingly connected with the tracks 22 and 24 by drive shafts 36 and 38.

When the vehicle 10 is being driven along a straight path, the input and output speed ratios of the hydrostatic transmissions 14 and 16 are simultaneously changed by equal amounts upon operation of a speed control or pressure regulator valve 42 which is connected with the hydrostatic transmissions through steering control valves 46 and 48. Assuming that the vehicle 10 is moving forwardly along a straight path at a relatively slow speed, the speed control valve 42 can be operated to increase the control fluid pressure transmitted through the steering valves 46 and 48 to pressure responsive pump actuator assemblies 50 and 52. The increase in control fluid pressure activates the pump actuator assemblies 50 and 52 to increase the effective displacement of the pump units 28 and 30 by equal amounts and thereby increase the forward speed at which the tracks 22 and 24 are driven. If the speed control valve 42 is operated to a sufficient extent, motor actuator assemblies 56 and 58 will decrease the effective displacement of the associated motor units 32 and 34 by equal amounts to further increase the speed at which the tracks 22 and 24 are driven.

If it is desired to turn the vehicle 10 toward either the left or the right, one of the steering control valves 46 or 48 is actuated to reduce the output speed of the hydrostatic transmission 14 or 16 connected with the track 22 or 24 on the side toward which the vehicle is to turn. Thus, if the vehicle is to be turned toward the left, the steering control valve 46 is actuated to reduce the output speed of the hydrostatic transmission 14 and the speed of movement of the track 22 relative to the hydrostatic transmission 16 and track 24. Similarly, if the vehicle is to be turned toward the right, the steering control valve 48 is actuated to reduce the output speed of the hydrostatic transmission 16 and the speed of the track 24.

Control fluid is supplied to the speed control valve 42 from an engine driven charge pump 62 (FIG. 1) through an antistall system 64. In the event of an impending overloading of the engine 20, the anti-stall system 64 effects a reduction in the pressure of the control fluid conducted to the speed control valve 42. This results in a reduction in the pressure of the control fluid ported to the pump and motor actuator assemblies 50, 52, 56 and 58 of the hydrostatic transmissions 14 and 16 to effect a corresponding reduction in the output speeds of the hydrostatic transmissions. Although many different types of anti-stall systems could be utilized, it is preferred to use the anti-stall system disclosed in application Ser. No. 237,086 filed Mar. 22, 1972 by Edward J. Bojas and entitled Hydrostatic Transmission Control system now U.S. Pat. No. 3,783,611 .

The pump unit 28 of the left hand transmission 14 is of the axial piston type (see FIG. 2) and has a swashplate 70 which is moved by the actuator assembly 50 to vary the output of the pump unit in a known manner. The pump unit includes a rotary barrel 74 fixedly connected to an engine driven drive shaft 76. When the swashplate 70 is pivoted in a counterclockwise direction from a generally horizontal (as viewed in FIG. 2) neutral position to the forward actuated position shown in FIG. 2, high pressure fluid flows through a conduit 80 of the hydrostatic loop to the motor unit 32 (FIG. 1). Low pressure fluid flows from the motor 32 through a conduit 86 of the hydrostatic loop to the pump unit 28. The rate at which fluid flows through the high pressure conduit 80 is increased as the swashplate 70 is moved further from the neutral position toward the fully actuated position of FIG. 2.

When the swashplate 70 of the pump unit 28 reaches the fully actuated position of FIG. 2, the rotational speed of the output shaft 36 is increased, while the engine operating speed remains constant by decreasing the displacement of the motor unit 32. To effect a decrease in the displacement of the motor unit 32, a swashplate of the motor unit 32 is pivoted by the motor actuator assembly 56 until the swashplate approaches, but does not reach, a zero displacement position. This movement of the motor swashplate decreases the effective displacement of the motor unit 32 so that the output shaft 36 is rotated through a complete revolution under the influence of a relatively small volume of fluid conducted from the pump unit 28 through the conduit 80 to the motor unit.

The direction of rotation of the output shaft 36 of the motor unit 32 can be reversed, without reversing the direction in which the engine 12 drives the input shaft 76 to the pump unit 28, by pivoting the swashplate 70 of the pump unit 28 in a clockwise direction from the neutral position. When the swashplate 70 is pivoted in a clockwise direction from the neutral position, the pump unit 28 forces fluid under pressure through the conduit 86 to thereby reverse the direction of operation of the motor unit 32. Of course during reverse operation of the pump unit 28, the conduit 80 conducts low pressure fluid from the motor unit 32 back to the pump unit 28. During operation of the pump unit 28 in either the forward or the reverse direction, make up fluid is supplied from the engine driven charge pump 62 (FIG. 1) to the low pressure conduit 80 or 86 of the hydrostatic loop.

The right hand hydrostatic transmission 16 (FIG. 1) is of the same construction as the left hand hydrostatic transmission 14 and cooperates with the speed control valve 42 and a steering control valve 48 in the same manner as does the left hand hydrostatic transmission. Thus, the pump and motor actuator assemblies 52 and 58 are activated in response to actuation of the speed control valve 42 to move pump and motor swashplates in the same manner as in which swashplates are moved by the pump and motor actuator assemblies 50 and 56.

Pump and Motor Actuator Assemblies:

The pump actuator assembly 50 moves the swashplate 70 of the pump unit 28 in response to changes in control fluid pressure conducted through conduits 114 and 116 (FIG. 2) to the steering control valve 46 and from the steering control valve 46 through conduits 118 and 120 to a pressure responsive control or secondary motor 126 in the pump actuator assembly. Operation of the control motor 126 actuates a pilot valve 128 from a null position to port fluid from the charge pump 72 to a swashplate or primary motor 132. A floating link type feedback assembly 134 interconnects the swashplate 70, pilot valve 128, and control motor 126 and returns the pilot valve to its null position when the swashplate motor 132 has moved the swashplate through a distance corresponding to the extent of coperation of the control motor.

When speed control valve 42 is in its neutral condition, the swashplate 70 of the pump unit 28 is moved to the neutral position of FIG. 3 by biasing springs 135 in the swashplate motor 132. The pump unit 28 will then have zero effective displacement and rotation of the input shaft 76 by the engine or prime mover 20 is ineffective to cause the transmittal of high pressure fluid from the pump unit to the motor unit 32 so that the left hand track 22 is not driven.

When it is desired to move the vehicle 10 forwardly, the speed control valve 42 is operated in a forward direction by moving a control handle 138 from the neutral position shown in dashed lines in FIGS. 2 and 3 to a forward actuated position shown in solid lines in FIGS. 2 and 3. This movement of the control handle 138 ports high pressure control fluid through the conduit 114 to the steering valve 46 and from the steering valve 46 through the conduit 120 to a pressure chamber 142 (FIG. 2) of the secondary or control motor 126. The high pressure control fluid causes a piston 144 to move downwardly against the influence of a spring assembly 148 from a neutral position toward a forward actuated position. During this movement of the piston 144, a piston rod 150 pivots a link 152 of the feedback assembly 134 to move a pilot valve spool 158. This movement of the valve spool 158 ports fluid through a conduit 164 to one cylinder 168 of the swashplate motor 132 and connects another cylinder 170 of the swashplate motor with drain through a conduit 174. Of course, the fluid pressure in the cylinder 168 effects operation of the swashplate motor 132 to pivot the swashplate 70 in a counterclockwise direction to effect operation of the hydrostatic transmission 14 in a forward direction.

When the swashplate 70 has been moved by the swashplate motor 132 to an extent corresponding to the extent of operation of the secondary or control motor 126, the feedback linkage 134 operates the pilot valve 128 to its null condition to interrupt further operation of the swashplate motor 132 and movement of the swashplate. The general mode of interaction between the feedback linkage 134, secondary motor 126, pilot valve 128 and swashplate motor 132 is, in certain respects at least, the same as is disclosed in U.S. Pat. No. 2,396,448.

Assuming that the operating speed of the engine 20 is not changed, changing the angular position of the swashplate 70 results in a corresponding change in the rate at which fluid is pumped under pressure through the conduit 80 to the motor unit 32 and the speed at which the shaft 36 is rotated in a forward direction.

Due to the effect of the feedback linkage 134, the extent to which the swashplate 70 is moved by the swashplate motor 132 is related to the extent to which the secondary or control motor 126 is operated by a change in pressure conducted from the speed control valve 42. However, the change in pressure conducted from the speed control valve 42 to the control motor 126 is related to the distance which the control handle 138 (see FIG. 2) is moved by the operator. Therefore, the operating speed of the output shaft 36 of the motor unit 32 and the speed of the left hand track 22 is varied to an extent which is a function of the extent of movement of the control handle 138 when the engine 20 is operating at a constant speed.

If the control handle 138 is moved through a relatively large distance in the forward direction from the neutral position, a relatively large change is made in the output speed of the hydrostatic transmission 14. To effect this relatively large change it may be necessary to increase the rotational speed of the output shaft 36 in a forward direction to a greater extent that can be accomplished by moving the swashplate 70 of the pump unit 28. Therefore, after the swashplate 70 of the pump unit 28 has moved to the fully actuated position of FIG. 2, the swashplate of the motor unit 32 is pivoted by the motor actuator assembly 56 to decrease the effective displacement of the motor unit. Decreasing the effective displacement of the motor unit 32 results in a corresponding increase in the output speed of the hydrostatic transmission 14.

The motor actuator assembly 56 is of the same general construction as the pump actuator assembly 50 and includes a single action secondary or control motor (not shown) which is operated to move a pilot valve from its null position to port fluid from the charge pump 62 to a swashplate motor. Operation of the swashplate motor in the motor actuator assembly 56 pivots the swashplate from a maximum displacement position. When the swashplate motor has been operated to move the motor swashplate to an extent which is related to the extent of operation of the associated secondary or control motor, the feedback linkage returns the pilot valve to its null condition to interrupt operation of the swashplate motor.

The secondary motor in the motor actuator assembly 56 is biased toward its unactuated position by a relatively strong spring assembly so that the motor actuator assembly 56 remains unactuated until the pump actuator assembly 50 has been fully actuated position. When the control handle 138 for the speed or pressure controller valve 42 is moved in the forward direction through a relatively large distance from the neutral position, the pressure conducted through the conduit 120 operates the secondary motor 126 in the pump actuator assembly 50 to the fully actuated position of FIG. 2 against the influence of the relatively weak biasing spring 148. The control fluid pressure in the fluid conduit 120 is ported by a selector valve 232 through a conduit 234 leading to the control motor in the motor actuator assembly 56. Since the biasing spring in the motor actuator assembly 56 is relatively strong, the motor actuator assembly remains inactive until after the control motor 126 in the pump actuator assembly 50 reaches the fully actuated condition of FIG. 2.

The selector valve 232 ports control fluid pressure from the conduit 114 to the motor actuator assembly 56 during forward operation of the hydrostatic transmission 14. During reverse operation of the hydrostatic transmission 14, the selector valve 232 ports control fluid pressure from the conduit 118 to the motor actuator assembly 56. The selector valve 232 includes a shuttle valve member 300 which is disposed in a housing 306 having an upper end portion (FIG. 2) which is connected in fluid communication with the conduit 120 and a lower end portion which is connected in fluid communication with the conduit 118.

The shuttle valve member 300 is moved between the forward and reverse activated positions in response to operation of the speed control valve 42 between forward and reverse operated conditions. During forward of the hydrostatic transmission 14, control fluid pressure in the conduit 120 is communicated to the upper end portion of the housing 306 and urges the shuttle valve member 300 to the forward actuated position of FIG. 2. Movement of the valve member 300 to this position is facilitated by the fact that the conduit 118 and the lower end portion of the housing 306 are connected with drain through the speed control valve 42. Similarly, when the hydrostatic transmission 14 is operated in the reverse direction, the speed control valve 42 connects the conduit 118 with the control fluid pressure and connects the conduit 120 with drain. This results in the shuttle valve 300 being moved to a reverse actuated position.

Although only the pump actuator assembly 50 and motor actuator assembly 56 for the pump unit 28 and motor unit 32 have been fully described, it should be understood that the pump actuator assembly 52 for the pump unit 30 and the motor actuator assembly 58 are of the same construction. Thus, the pump actuator assembly 52 includes a secondary motor 308 which is connected with the speed control valve 42 through the steering valve 48 in the same manner as in which the secondary motor 126 of the pump actuator assembly 50 is connected with the speed control valve 42 through the steering valve 46. The pump actuator assembly 52, like the pump actuator assembly 50, includes a pilot valve 310 which is operated by the associated secondary or control motor 308 to effect operation of a swashplate motor 311 and thereby vary the displacement of the pump unit 30. A feedback linkage 312, similar to the feedback linkage 134, is provided between the swashplate of the pump unit 30 and the associated pilot valve 310 and secondary motor 308.

A selector valve 314, similar to the selector valve 232, directs control fluid pressure to a single action secondary motor in the motor actuator assembly 58 during either forward or reverse operation of the hydrostatic transmission 16 in the same manner as in which the selector valve 232 ports fluid control fluid pressure to the motor actuator assembly 56 of the hydrostatic transmission 14. In addition to a secondary motor, the motor actuator assembly 58 includes a pilot valve which is operated by the secondary motor to port fluid to a swashplate motor to vary the effective displacement of the motor unit 34. In view of their similarity of construction and mode of operation, it is believed that a further description of the pump and motor actuator assemblies for the hydrostatic transmission 16 will not have to be set forth herein in view of the foregoing description of the pump and motor actuator assemblies 50 and 56 for the hydrostatic transmission 14. However, the pump and motor actuator assemblies are constructed and operate in the manner disclosed and claimed in copending application Ser. No. 248,685 filed Apr. 28, 1972 by Edward J. Bojas et al and entitled Hydrostatic Transmission Drive System now U.S. Pat. No. 3,795,109 and is included herein in its entirety by this reference thereto.

Speed Control Valve:

The speed control valve 42 is connected in fluid communication, through the steering control valves 46 and 48, with the pump and motor actuator assemblies 50 and 56 for the hydrostatic transmission 14 and with the pump and motor actuator assemblies 52 and 58 for the hydrostatic transmission 16. The conduits 114 and 116 from the speed control valve 42 are connected through the steering control valves 46 and 48 with the pump and motor actuator assemblies for both of the hydrostatic transmissions 14 and 16. Operation of the speed control valve in either a forward or reverse direction from the neutral position (illustrated in dashed lines in FIG. 3) effects operation of the pump and actuator assemblies 50 and 52 for the pump units 28 and 30 to the same extent. If the control handle 138 is moved through a sufficient distance to effect an operation of both pump units 28 and 30 to their fully swashed or maximum displacement conditions, pressure responsive motors in the motor actuator assemblies 56 and 58 simultaneously effect equal decreases in the displacements of the motor units 32 and 34.

The speed control valve 42 is of the pressure regulator type and ports control fluid pressure through the conduit 114 to the steering control valves 46 and 48 upon movement of the control handle 138 in the forward direction from the neutral position. When the fluid pressure in the conduit 114 has been increased to an extent which corresponds to the extent of movement of the control handle 138 from the neutral position, the control valve 42 blocks fluid flow to the conduit 114. Similarly, when control handle 138 is moved in a reverse direction from the neutral position, that is in a clockwise direction from the position illustrated in dashed lines in FIG. 3, control fluid pressure is ported to the conduit 116 which is connected to the steering control valves 46 and 48.

The speed control valve 42 includes a valve spool 350 which is slidably disposed in a generally cylindrical valve chamber 352 in a housing 354. The valve chamber 352 is connected in continuous fluid communication with the charge pump 62 and antistall system 64 by a fluid conduit 356. The valve chamber 352 is also connected with drain by a fluid conduit 358.

Movement of the control handle 138 from the neutral position (illustrated in dashed lines in FIG. 3) to a forward actuated position (illustrated in solid lines in FIG. 3) moves the valve spool 350 from a centered or closed position within the housing 354 toward the left to the actuated or open position illustrated in FIG. 3. This movement of the valve spool 350 ports control fluid pressure from the conduit 356 to the conduit 114 and the steering control valves 46 and 48. In the absence of actuation of one of the steering control valves 46 or 48, the fluid pressure is conducted from the steering control valves to the pump actuator assemblies 50 and 52 and motor actuator assemblies 56 and 58. Thus, high pressure fluid from the charge pump 62 and antistall system 64 enters the valve chamber 352 and passes through an annular passage between two circular lands 362 and 364 on the open valve spool 350 to the conduit 114. This high pressure control fluid also flows through a radially extending passage 366 formed at the land 362 to a pressure chamber 368.

While control fluid pressure is being directed from the conduit 114 to pressure chambers of the secondary motors in the pump actuator assemblies 50 and 52 and to pressure chambers of the secondary motors in the motor actuator assemblies 56 and 58, other chambers in the secondary motors are connected with drain through the conduit 116. The conduit 116 is connected with drain through an annular passage between lands 364 and 374 on the valve spool 350 and the drain passage 358. It should be noted that a pressure chamber 378 is also connected with drain by a radially extending passage 380 extending through the circular land 364 (FIG. 3).

As the secondary motors in the pump actuator assemblies 50 and 52 are operated against the influence of their biasing springs, similar to the biasing spring 148, the pressure in the conduit 114 increases. Assuming that the actuator handle 138 was moved in the forward direction through a sufficient distance, the pressure in the conduit 114 continues to increase during actuation of the secondary motors in the motor actuator assemblies 56 and 58 against the influence of spring assemblies. The increase in fluid pressure in the conduit 114 is transmitted through the passage 366 in the valve spool 350 to the pressure chamber 368 which is located between a piston element 382 and the valve spool.

As the pressure in the chamber 368 increases, the valve spool 350 slides axially along a support rod 386 from the open position of FIG. 3 toward a closed or centered position against the influence of a biasing spring 390. When the valve spool 350 reaches the closed position, the land 362 is midway of an annular recess 394 in the housing 354. The passage 114 is then connected by the recess 394 with both the control fluid supply conduit 356 and an entrance 398 to the drain conduit 358. The land 362 on the closed or centered valve spool 350 substantially blocks fluid flow to and from the conduit 114 by providing a modulating action between the conduit 114, the control fluid supply conduit 356, and the drain conduit 358. This modulating action maintains the secondary motors in the pump actuator assemblies 50 and 52 and in the motor actuator assemblies 56 and 58 in an operated position which corresponds to the extent to which the control lever 138 is moved from the initial position shown in dashed lines in FIG. 3. However, when the valve spool 350 is in the closed position the conduit 114 and the secondary motors of the pump and motor actuator assemblies 50, 52, 56, and 58 are connected in fluid communication with both the drain conduit 358 and the control fluid supply conduit 356 to facilitate rapid response of the secondary motors to operation of the control valve 42.

Movement of the control handle 138 from the neutral position shown in dashed lines in FIG. 3 results in operation of the secondary motors in the pump actuator assemblies 50 and 52 to an extent which is porportional to the distance to which the handle 138 is moved. However if the handle 138 is moved through such a large distance that the pump units 28 and 30 reach the fully swashed position, the secondary motors in the motor actuator assemblies 56 and 58 are actuated to decrease the displacement of the motor units 32 and 34. Thus, when the actuator handle 138 is moved through a relatively large distance, the combined extent to which the secondary motors in the pump actuator assembly 50 and motor actuator assembly 56 are operated is proportional to the distance which the handle is moved. Similarly, the combined extent to which the secondary motors in the pump actuator assembly 52 and motor actuator assembly 58 are operated is proportional to the distance to which the handle 138 is moved. This results from the fact that the pistons in the various secondary motors are moved against the influence of the associated biasing springs and that the valve spool 350 is moved against the influence of the biasing spring 390.

Figure 6:
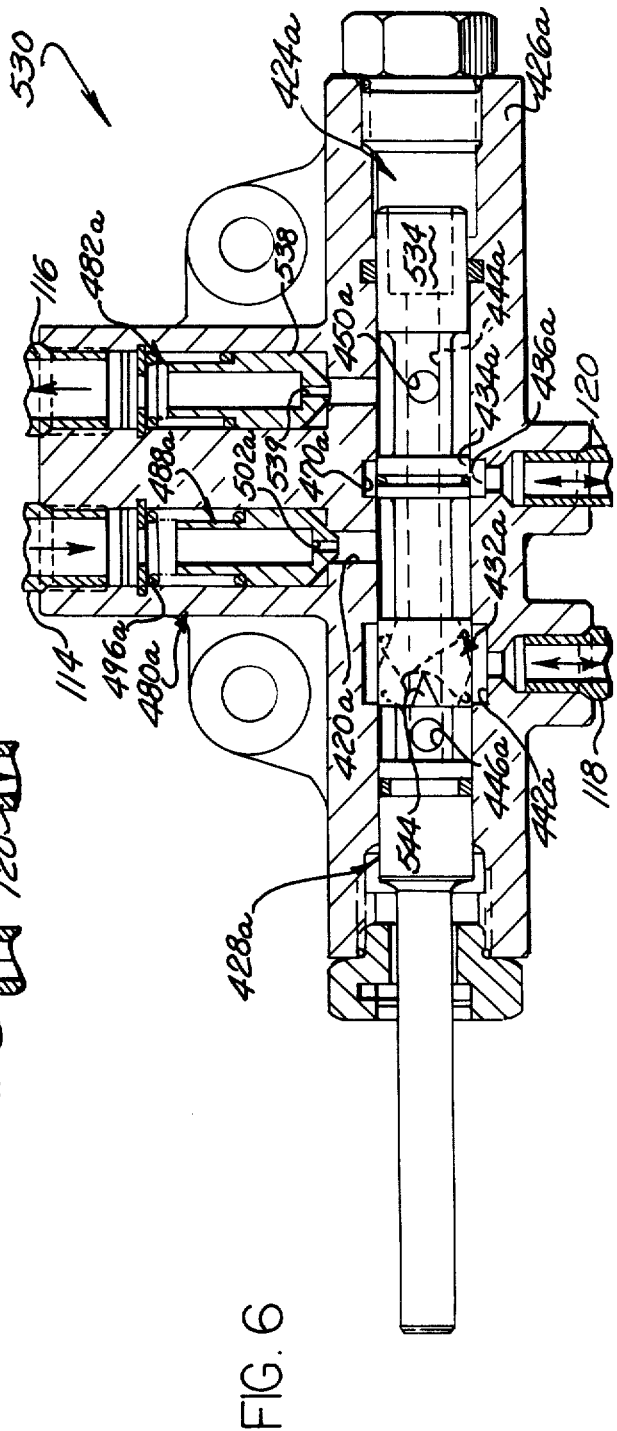
FIG. 6 is a sectional view illustrating the steering control valve of FIG. 5 in a centered or intermediate position in which the hydrostatic transmission associated with the steering control valve is ineffective to drive an associated track of the vehicle.

The further the handle 138 is moved in a forward direction from the neutral position, the greater is the extent to which the biasing spring 390 is compressed and the greater is the fluid pressure which must be built-up in the pressure chamber 368 to move the valve spool 350 from the open position of FIG. 6 to the closed position in which the valve spool is centered in the valve chamber 352. Of course, the fluid pressure in the chamber 368 is directly proportional to the fluid pressure in the conduit 114. Therefore, the greater the fluid pressure in the chamber 368, the greater the pressure in the motor chambers of the secondary motors for the pump and motor actuator assemblies 50, 52, 56 and 58. The general relationship between the extent to which the handle 138 is moved and the extent to which the control fluid pressure in the conduit 114 is varied is generally similar to that disclosed in U.S. Pat. No. 3,540,220 which is included herein by this reference thereto.

When the valve spool 350 is in the closed or centered position and an impending stall or overloading condition for the engine 20 is encountered, the anti-stall system 64 will decrease the fluid pressure communicated through the conduit 356 to the speed control valve 42. The decrease in fluid pressure is communicated to the conduit 114 and the secondary motors for the pump and motor actuator assemblies 50, 52, 56 and 58. The decrease in fluid pressure also results in a decrease in the fluid pressure in the chamber 368 to enable the spring 390 to move the valve spool 350 to the left from the centered position toward the open position of FIG. 3. This movement of the valve spool 350 increases the communication of the conduit 116 with drain and of the conduit 114 with the fluid pressure supply line 356. Since the fluid pressure in the supply line 356 has been reduced by the anti-stall system 64, the motor actuator assemblies 56 and 58 return the swashplates of the motor units 32 and 34 toward their maximum displacement conditions. Thereafter, the pump actuator assemblies 50 and 52 move the swashplates of the pump units toward their minimum displacement conditions. The valve spool 350 remains in the open position until the fluid pressure in the supply conduit 356 increases sufficiently to again move the valve spool against the influence of the biasing spring 234 to the centered or closed position.

When the control handle is operated in the reverse direction, the valve spool 350 is moved toward the right (as viewed in FIG. 3) to connect the conduit 116 with the fluid supply line 356 and to connect the conduit 114 with drain. As the pressure in the conduit 116 builds up, it is transmitted through the radial passage 380 to the pressure chamber 378 to move the valve spool to the centered modulating position against the influence of the biasing spring 402. Although other known valve constructions could be utilized, the specific speed control valve construction 42 shown in FIG. 3 is preferred due to its cooperation with the anti-stall system 64. The specific construction of the anti-stall system 64 and its interaction with the speed control valve 42 is set forth in the previously mentioned U.S. Pat. No. 3,783,611 and is incorporated herein in its entirety by this reference thereto.

One Embodiment Of The Steering Control Valves

The input to output speed ratios of the left and right hand hydrostatic transmissions 14 and 16 can be independently varied by operation of the associated one of the steering valves 46 or 48 which are constructed in accordance with the present invention. Thus, the output speed of the left hand hydrostatic transmission 14 can be decreased relative to the right hand hydrostatic transmission 16 by operating the steering valve 46. The extent to which the operating speed of the left hand hydrostatic transmission 14 is decreased depends upon the extent to which the steering valve 46 is operated. If the steering valve 46 is operated to a sufficient extent the left hand hydrostatic transmission 14 will stop driving the track 22 and upon continued operation of the steering valve 46 will reverse the direction of operation of the track 22 to enable the vehicle 10 to turn sharply. Of course, operating the right hand steering valve 48 results in a corresponding change in the operating speed of the right hand hydrostatic transmission 16.

When the left hand steering control valve 46 is in an initial or unactuated position and the main speed control valve 42 is in the forward operated position (as shown in FIG. 3), the steering control valve ports high pressure fluid from the conduit 114 to the conduit 120 which is connected in fluid communication with the pressure chamber 142 in the secondary motor 126 of the pump actuator assembly 50. Thus, when the steering control valve 46 is in its initial position (shown in solid lines in FIG. 3) high pressure fluid from the conduit 114 is conducted through an inlet 420 to a cylindrical valve chamber 424 formed in a housing 426 and enclosing a slidable valve spool 428. Control fluid from the inlet 420 passes through chamber 470 between annular lands 432 and 434 to an annular recess 436 connected with the conduit 120 and the pump actuator assembly 50.

In addition to connecting the secondary motor 126 in the pump actuator assembly 50 with control fluid pressure ported from the speed control valve 42, the steering control valve 46 connects the conduit 118 and the secondary motor 126 (FIG. 2) with the speed control valve 42 which connects them with drain during forward operation of the hydrostatic transmission 14. The conduit 118 is connected in fluid communication with the steering valve chamber 424 through an annular recess 442. When the steering valve 46 is in the unactuated position of FIG. 3, the recess 442 is connected in fluid communication with the conduit 116 by a passage 444 formed in the valve spool 428. The passage 444 has an annular opening 446 which is connected directly with the entrance 442 for the conduit 118 and a second annular opening 450 which is connected directly with an opening 454 in the housing 426 when the valve spool 428 is in the unactauted position illustrated in FIG. 6. The opening 454 is connected in fluid communication with the conduit 116 which is connected with drain through the speed control valve 42 when the speed control valve is in the forward actuated position.

When it is desired to turn the vehicle 10 toward the left (as viewed in FIG. 1) as it is moving forward, the steering valve 46 is actuated to decrease the output speed of the left hand hydrostatic transmission 14 relative to the output speed of the right hand hydrostatic transmission 16 to thereby decrease the speed of the track 22 relative to the track 24. This actuation of the steering valve is effected by pivoting a control member or pedal 460 in a counterclockwise direction from the position shown in solid lines in FIG. 3 toward the position shown in dashed lines at 462 in FIG. 3. As the pedal 460 approaches the dashed line position 462, the lands 432 and 434 on the valve spool 428 are moved into a blocking relationship with the entrances 442 and 436 to the conduits 118 and 120. As the pedal 460 continues to move in a counterclockwise direction from the position illustrated in dashed lines at 462 in FIG. 3 to the position illustrated in dashed lines at 466 in FIG. 3, the entrance 436 to the conduit 120 is connected with the conduit 116 and drain through the speed control valve 42. Similarly, the conduit 118 is connected with the conduit 114 and control fluid pressure by the annular central recess 470 formed between the lands 432 and 434 on the valve spool 428. Thus actuation of the steering control valve 46 during forward operation of the hydrostatic transmission 14 connects the conduit 120, which was initially connected with control fluid pressure, with drain and connects the conduit 118, which was initially connected with drain, with control fluid pressure.

Reversing the drain and control fluid pressure connections for the conduits 118 and 120 results in operation of secondary motor 126 from a forward operating condition toward a reverse operating condition. If the actuator pedal 460 remains in the dashed line position 466, the control fluid pressure conducted to the secondary motor 126 will reverse the direction of operation of the hydrostatic transmission 14. This is because the piston 144 moves through sufficient distance to activate the swashplate motor 132 to move the swashplate 70 from the forward actuated position of FIG. 2 through the neutral position to a reverse actuated position. Of course this effects a reversal in the direction of operation of the motor unit 32 to reverse the direction in which the track 22 is driven by the left hand hydrostatic transmission 14.

If the steering control valve is operated with the motor unit 32 in a condition other than its maximum displacement condition, the control fluid pressure to the secondary motor in the motor actuator assembly 56 is reduced to effect operation of the motor unit 32 to the maximum displacement condition prior to operation of the secondary motor 126 in the pump actuator assembly 50. This operation of the secondary motor in the motor actuator assembly 56 results from the fact that the biasing spring assembly in the motor actuator assembly 56 has a higher spring load than the biasing spring 148 in the secondary motor 126 of the pump actuator assembly 50. of course, a continuing reduction of the control fluid pressure results in subsequent operation of the secondary motor 126 in the pump actuator assembly 50.

If the control pedal 460 for the steering control valve 46 is moved to the fully actuated position with the swashplate of the motor unit 32 in a minimum displacement condition, the motor actuator assembly 56 first effects pivotal movement of the motor swashplate back to the maximum displacement condition and then effects pivotal movement of the pump swashplate 70 back to the minimum displacement condition. During the time period in which the swashplate 90 of the motor unit 32 is in its maximum displacement condition, the swashplate 70 in the pump unit 28 is moved from its maximum forward displacement condition (shown in FIG. 3) to a maximum reverse displacement condition. When the swashplate of the motor unit 32 has returned to the minimum displacement position with the swashplate 70 of the pump unit 28 in its maximum reverse displacement condition, the speed and direction at which the drive shaft 36 is driven by the motor unit 32 is reversed to thereby reverse the direction of operation of the track 22 relative to the track 24 and effect a sharp pivoting or rotation of the vehicle 10 about its center.

The steering control valve 48 is of the same construction as the steering control valve 46 and cooperates with the speed control valve 42, pump actuator assembly 52, and motor actuator assembly 58 in the same manner in which the steering valve 46 cooperates with the speed control valve, motor actuator assembly 50, and pump actuator assembly 56. Thus, the steering valve 48 includes a valve chamber which is connected in fluid communication with the conduits 114 and 116 and with the secondary motor for the pump actuator assembly 52. Upon operation of the steering control valve 48, the displacement of the pump unit 30 can be decreased and even reversed to effect a slowing down and reversal of operation of the motor unit 34. However, it should be noted that when the steering valves 46 and 48 are in their unactuated or initial positions the speed control valve 42 controls the speed and direction of operation of the hydrostatic transmissions 14 and 16 to drive the tracks 22 and 24 at the same speed in a forward or reverse direction.

When the steering control valve 46 or 48 associated with one of the hydrostatic transmissions 14 or 16 is actuated, the operation of the other hydrostatic transmission should advantageously be uneffected. However, the steering valves 46 and 48 are connected in fluid communication with each other and the speed control valve 42 by the conduits 114 and 116. Due to this fluid communication, a high rate of flow of control fluid through one of the steering valves 46 or 48 when actuated for steering the vehicle will tend to reduce the control fluid pressure communicated to the other unactuated steering valve. Of course, reducing the control fluid pressure communicated to the unactuated steering valve may result in an operation of the associated pump or motor actuator assembly and a reduction in output speed of the transmission associated therewith. This would result in ineffective steering. Therefore, it is necessary to retard the flow of control fluid from the speed control valve 42 through an actuated steering control valve 46 or 48 in order to prevent an undesired reduction in the control fluid pressure conducted to the other steering control valve. It is also desirable to provide for a relatively unrestricted flow of fluid from the secondary motors of the pump and motor actuator assemblies 50, 52, 56 and 58 through the steering valves 46 and 48 to the speed control valve 42 and drain to provide for an accurate response of the secondary control motors to a change in control fluid pressure.

In accordance with one feature of the present invention, identical orifice and check valve assemblies 480, 482, 484 and 486 (see FIGS. 2 and 3) are associated with each of the steering valves 46 and 48. The orifice and check valve assemblies 480 and 482 enable the steering valve 46 to be actuated to change the effective displacement and output speed of the hydrostatic transmission 14 while maintaining the effective displacement and output speed of the hydrostatic transmission 16 constant. A second set of orifice and check valve assemblies 484 and 486 (FIG. 2) enable the steering valve 48 to be actuated to change the effective displacement and output speed of the hydrostatic transmission 16 while maintaining the effective displacement and output speed of the hydrostatic transmission 14 constant. Thus, the orifice and check valve assemblies 480, 482, 484 and 486 enable the output speed of the hydrostatic transmissions 14 and 16 to be independently varied upon actuation of an associated one of the steering control valves 46 or 48 even though the steering control valves and pump actuator assemblies 50 and 52 are connected in fluid communication through the conduits 114 and 116.

The orifice and check valve assemblies 480 and 482 restrict fluid flow from the speed control valve 42 through the associated steering control valve 46 and enable fluid to flow freely from the steering control valve 46 to the speed control valve. Thus during forward operation of the hydrostatic transmission 14, the orifice and check valve assembly 480 restricts fluid flow from the conduit 114 through the steering valve 46 to the conduit 120 which is connected with the pump and motor actuator assemblies 50 and 56. However during forward operation of the hydrostatic transmission 14, fluid can flow freely from the pump and motor actuator assemblies 50 and 56 through the orifice and check valve assembly 482 to drain through the conduit 116. When the hydrostatic transmission 14 is being operated in the reverse direction, the orifice and check valve assembly 482 restricts fluid flow from the conduit 116 to the pump and motor actuator assemblies 50 and 56 while the orifice and check valve assembly 480 enables fluid to flow freely from the pump and motor actuator assemblies 50 and 56 to the speed control valve 42 and drain.

Similarly, the orifice and check valve assemblies 484 and 486 restrict fluid flow from the speed control valve 42 through the associated steering control valve 48 and enable fluid to flow freely from the associated steering control valve to the speed control valve. Thus during forward operation of the hydrostatic transmission 16, the orifice and check valve assembly 484 restricts fluid flow from the conduit 114 through the steering valve 48 to the conduit which is connected with the pump and motor actuator assemblies 52 and 58. However during forward operation of the hydrostatic transmission 16, fluid can flow freely from the pump and motor actuator assemblies 52 and 58 through the orifice and check valve assembly 486 to drain through the conduit 116. When the hydrostatic transmission 16 is being operated in the reverse direction, the orifice and check valve assembly 446 restricts fluid flow from the conduit 116 to the pump and motor actuator assemblies 52 and 58 while the orifice and check valve assembly 484 enables fluid to flow freely from the pump and motor actuator assemblies 52 and 58 to the speed control valve 42 and drain.

The orifice and check valve assembly 480 includes a valve member 488 which is slidably mounted in a chamber 492 in a housing 494. The valve member 488 is biased to the illustrated closed position under the influence of a spring 496. When the valve member 488 is in the closed position of FIG. 3, fluid under pressure can flow from the conduit 114 to the steering valve chamber 424 through an orifice or restriction 502. The orifice 502 restricts the rate at which fluid can flow from the conduit 114 through the steering valve 46 to the pump and motor actuator assemblies 50 and 56 during operation of the hydrostatic transmission 14 in the forward direction to effectively isolate the pump and motor actuator assemblies 52 and 58 for the right hand transmission 16 from the effects of operation of the steering valve 46 for the left hand transmission 14 even though the actuator assemblies for the right and left hand transmissions are connected in fluid communication with each other and the speed control valve 42 through the conduit 114. Therefore, the steering valve 46 can be actuated to effect a change in the input to output speed ratio of the hydrostratic transmission 14 without changing the input to output speed ratio of the hydrostatic transmission 16.

When the hydrostatic transmission 14 is to be operated in the reverse direction, fluid is exhausted from the pump and motor actuator assemblies through the conduit 120 to the steering valve 46 and through the conduit 114 to the speed control valve 42 and drain. To enable the pump and motor actuator assemblies 50 and 56 to respond quickly to a change in control fluid pressure, it is necessary to provide for a relatively unrestricted flow of fluid from the pump and motor actuator assemblies 50 and 56 to the speed control valve 42 and drain. To provide for this relatively unrestricted flow, the valve member 488 in the orifice and check valve assembly 480 (FIG. 3) can be opened against the influence of the biasing spring 496 to provide for relatively free communication of fluid from the valve chamber 424 through the inlet 420 and passages 504 (FIG. 4) around the valve member 488 and to the conduit 114. When the valve member 488 is in the open position, it is spaced from a valve seat and fluid can flow from the inlet 420 to the conduit 114 through any one of a plurality of longitudinally extending passages 504 formed in the exterior of the valve member 488. Thus during reverse operation of the hydrostatic transmission 14, the orifice and check valve assembly 480 enables fluid to flow freely from the steering valve 46 to the speed control valve 42.

During reverse operation of the hydrostatic transmission 14, the orifice and check valve assembly 482 prevents excessive pressure drops from occurring in the conduit 116 during operation of the steering valve 46 to thereby prevent an undesired change in the input to output speed ratio of the hydrostatic transmission 16. Although only the orifice and check valve assemblies 480 and 482 associated with the steering valve 46 have been illustrated in FIG. 3, it should be understood that orifice and check valve assemblies 484 and 486 are of the same construction and cooperate with the steering valve 48 in the same manner. Although the orifice and check valve assemblies 480, 482, 484 and 486 have been disclosed herein in association with specific steering control valves 46 and 48, it is contemplated that the orifice and check valve assemblies could be utilized in combination with other steering valves. In fact, it is contemplated that the orifice and check valve assemblies could be associated with steering valves constructed as disclosed in the aforementioned Keith et al application Ser. No. 158,455 filed June 30, 1971 now U.S. Pat. No. 3,727,402. It is also contemplated that the orifice and check valve assemblies 480, 482, 484 and 486 could be moved either upstream or downstream from their associated steering valves if so desired.

Pressure Modulating Steering Control Valve

In another specific preferred embodiment of the invention, the steering control valve modulates the control fluid pressure conducted to associated pump and motor actuator assemblies to decrease the control fluid pressure as a linear function of actuation of the steering control valve. By varying control fluid pressure as a linear function of steering valve actuation, the output speed of the associated hydrostatic transmission is varied as a linear function of steering valve actuation.

A steering valve 530 (see FIGS. 5–7), constructed in accordance with this embodiment of the invention, is connected with the pressure conduits 114–120 in place of the steering control valve 46 to modulate the control fluid pressure conducted to the pump and motor actuator assemblies 50 and 56 for the hydrostatic transmission 14. Since the embodiment of the steering control valve shown in FIGS. 5 through 7 is in certain respects similar to the steering control valve 46, numerals similar to those utilized to designate components of the valve 46 have been utilized to designate components of the valve 530, the suffix letter *a* being associated with the steering valve 530 to avoid confusion.

The steering valve 530 includes a valve spool 428*a* which is disposed in a cylindrical valve chamber 424*a* in a valve housing 426*a* and is connected with a suitable actuator pedal or lever (not shown but similar to the actuator pedal 460). When the valve spool 428*a* is in the unactuated position of FIG. 5 and the hydrostatic transmission 14 is being operated in the forward direction, high pressure control fluid flows from the speed control valve 42 through the conduit 114 to a combination orifice and check valve assemby 480*a* and then through the steering control valve 530 to the conduit 120. Fluid flow from the conduit 114 through the combination orifice and check valve assembly 480*a* toward the conduit 120 is restricted by an orifice or opening 502*a* in a valve member 488*a* which is biased to its closed position under the influence of fluid pressure and a biasing spring 496*a*. During forward operation of the hydrostatic transmission 14, this construction of the combination orifice and check valve assembly 480*a* prevents actuation of the steering control valve 530 from effecting a change in the displacement and input to output speed ratio of the hydrostatic transmission 16 in the same manner as previously explained in conjunction with the combination orifice and check valve assembly 480. Similarly, during reverse operation of the hydrostatic transmission 14, a combination orifice and check valve assembly 482*a* retards a flow of control fluid to the pump and motor actuator assemblies 50 and 56.

During forward operation of the hydrostatic transmission 14, control fluid pressure flowing from the orifice 502*a* enters the valve chamber 424*a* through an opening 420*a*. The fluid then flows through an annular passage 470*a* formed between annular valve lands 432*a* and 434*a* to an entrance 436*a* leading to the conduit 120 and the pump and motor actuator assemblies 50 and 56. In addition, fluid can flow from the pump and motor actuator assemblies 50 and 56 through the conduit 118 which is connected in communication with the valve chamber 424*a* by an opening 442*a*. The opening 442*a* is connected with an axially extending central passage 444*a* formed in the valve spool 428*a* through a circular opening 446*a* in the valve spool. Fluid returned from the pump and motor actuator assemblies 50 and 56 leaves the passage 444*a* through an opening 450*a* located between the valve land 434*a* and an end land 534 on the valve spool 428*a*. This return fluid has sufficient pressure to force a valve member 538 in the orifice and check valve assembly 482*a* to the illustrated open position. Since the check valve member 538 is open, fluid can flow around an orifice 539 through axially extending bypass passages having the same configuration as the passages 504 of FIG. 4. The fluid then flows through the conduit 116 back to the speed control valve 42 and to drain through the conduit 358. Of course during reverse operation of the hydrostatic transmission 14, high pressure control fluid flows through the combination orifice and check valve assembly 482*a* to the pump and motor actuator assemblies and flows from the pump and motor actuator assemblies to drain through the combination orifice and check valve assembly 480*a*.

Figure 5:
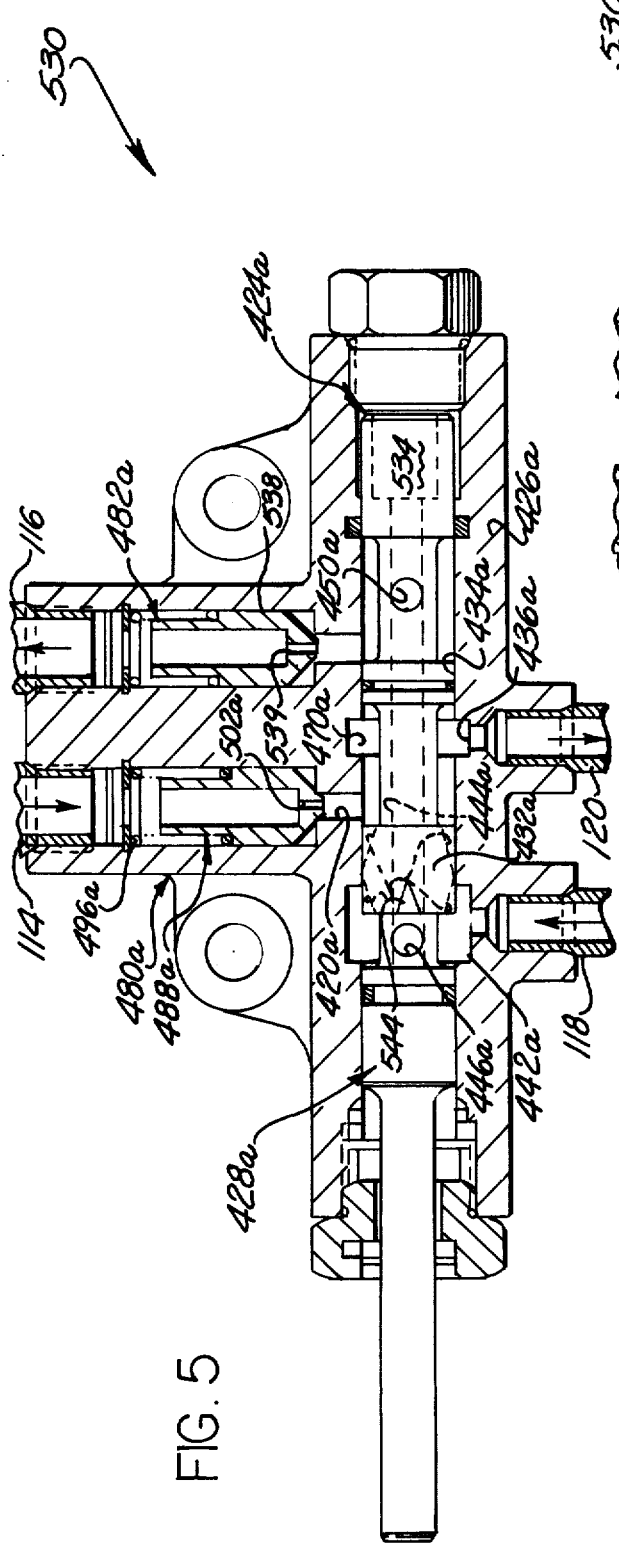
FIG. 5 is a sectional view of an embodiment of the control valve which is constructed so as to provide a linear relationship between actuation of the valve and variations in control fluid pressure conducted to an associated actuator assembly, the valve being shown in an initial or unactuated condition.

In accordance with a feature of the steering valve 530, upon actuation of the steering valve from the initial position of FIG. 5 toward an intermediate actuated position shown in FIG. 6, the valve land 432*a* modulates or controls the rate of variation in fluid communication between the relatively high pressure fluid conduits 114 and 120 and the relatively low pressure fluid conduits 116 and 118. This modulating action provided by the valve land 432*a* causes the fluid pressure conducted to the pump and motor actuator assemblies 50 and 56 to vary as a linear function of movement of the valve spool 428*a*. Although it is contemplated that this modulating action could be obtained in other ways, the modulating action is obtained by providing metering undercuts 544 in the valve land 432*a*. These undercuts 544 have a generally triangular cross sectional and plan configuration and are sized so that once the valve spool 428*a* has been moved from the initial position shown in FIG. 5 toward the actuated position of FIG. 6, an increment of valve spool movement results in an incremental decrease in the fluid pressure conducted to the pump and motor actuator assemblies 50 and 56 through the conduit 120. Therefore, the fluid pressure conducted to the pump and motor actuator assemblies 50 and 56 varies as a linear function of movement of the valve spool 128*a*.

Figure 10:
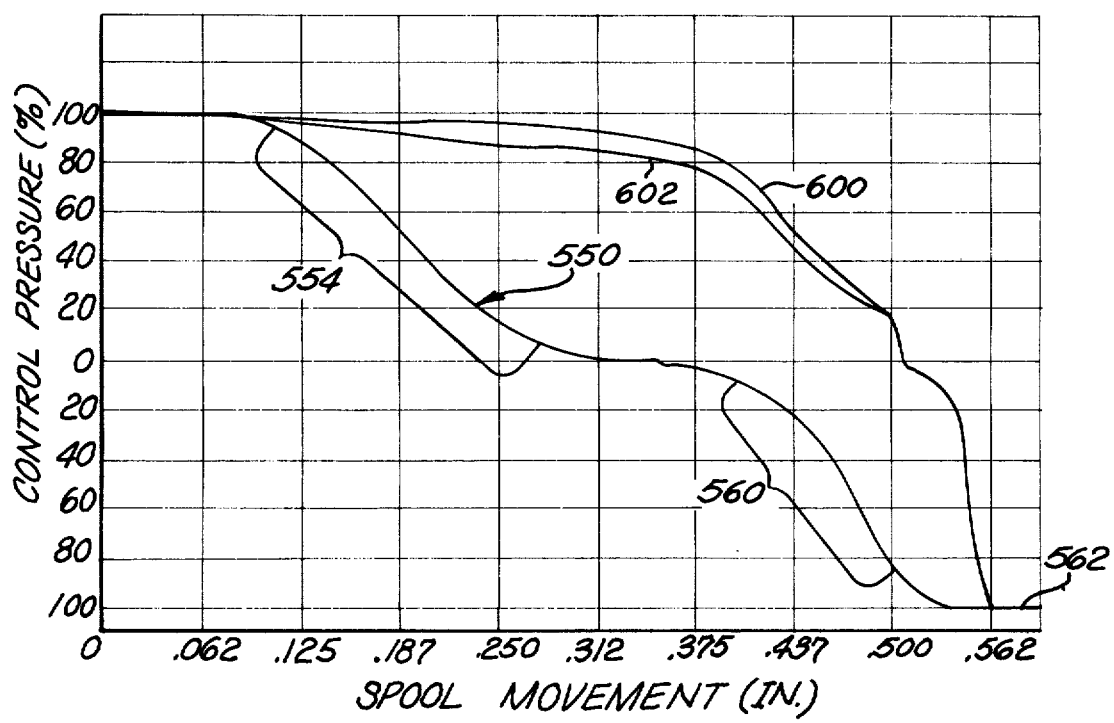
FIG. 10 is a graph depicting the variation in control fluid pressure conducted to an actuator assembly associated with the steering control valve of FIG. 6 and steering control valves constructed as shown in FIG. 8.

This linear variation of fluid pressure with movement of the valve spool 428*a* is depicted graphically by the curve 550 in FIG. 10. Thus once the valve spool 428*a* has been moved through a sufficient distance to initiate fluid communication of the conduit 120 with the conduit 118 and the drain conduit 116 through the undercuts 544 in the right hand portion of the valve land 432*a*, each increment of movement of the valve spool results in an incremental decrease in control fluid pressure conducted through the conduit 120. This incremental decrease in control fluid pressure in the conduit 120 with movement of the valve spool 428*a* causes the pump and motor actuator assemblies 50 and 56 to decrease the output speed of the hydrostatic transmission 14 as a linear function of movement of the valve spool 428*a*. This range of linear pressure variation with movement of the valve spool 428*a* is shown by a portion 554 of the curve 550 in FIG. 10.

When the valve spool 428*a* reaches the intermediate position shown in FIG. 6, the fluid pressure in the conduits 118 and 120 is equal to drain pressure (designated as zero pressure in FIG. 10). When this occurs the valve spool 428*a* will have moved through approximately 0.350 inches (see FIG. 10) and the return springs in the pump and motor actuator assemblies 50 and 56 will have returned the motor unit 32 to its maximum displacement condition and the pump unit 28 to its neutral condition in which the hydrostatic transmission 14 is ineffective to drive the track 22 of the vehicle 10. Therefore, the track 22 will be "dead" and the vehicle will turn about a center extending through a longitudinal axis 558 of the track 22 under the influence of drive forces transmitted to the track 24 by the hydrostatic transmission 16.

Continued movement of the valve spool 428a from the intermediate position of FIG. 6 toward the fully actuated position of FIG. 7 results in the conduit 118 being connected in fluid communication with the high pressure conduit 114 through the portion of the valve chamber 424a located between the lands 432a and 434a. The conduit 120 is then connected with drain through the conduit 116. Of course, the high pressure control fluid in the conduit 118 effects operation of the pump actuator assembly 50 to operate the pump unit 28 to a reverse actuated position. This effects a reversal in the direction of operation of the motor 32 and the direction at which the track 22 is driven by the output shaft 36. Reversing the direction of movement of the track 22 results in a pivoting of the vehicle 10 about a turning center which is located inwardly of the longitudinal axis 558 extending through the track 22. As the valve spool 428a is moved incrementally from the position shown in FIG. 7 to the position shown in FIG. 8, the fluid pressure in the conduit 118 increases linearly, as indicated by the portion 560 of the curve 550 (see FIG. 10). As the pressure in the conduit 118 increases as a linear function of valve spool movement, the center about which the vehicle 10 turns moves closer and closer to the center of the vehicle. Finally, when the fluid pressure reaches the point indicated at 562 in FIG. 10, the track 22 is driven in the reverse direction at the same speed in which the track 24 is driven in the forward direction to thereby effect a pivoting of the vehicle 10 about its center. This linear variation in fluid pressure with valve spool movement, as indicated by the portion 560 of the curve 550, results from a metering action provided by the undercuts 544 as they gradually interrupt fluid communication between the conduit 118 and the conduit 116.

Although the foregoing description of the operation of the valve 530 has related to forward operation of the vehicle 10, it should be understood that the steering valve 530 modulates the flow of fluid pressure to provide a linear relationship between valve spool movement and pressure change while the vehicle 10 is being operated in the reverse direction. Thus when the vehicle 10 is moving rearwardly, the speed control valve 42 connects the conduit 116 with high pressure control fluid and the conduit 114 with drain. Therefore, when the steering control valve 530 is in the unactuated condition of FIG. 5, the conduit 118 is connected with control fluid pressure and the conduit 120 is connected with drain. Upon movement of the valve spool 428a toward the intermediate position of FIG. 6, the undercuts 544 gradually connect and conduit 118 with the drain conduit 114 and the conduit 120 with the pressure conduit 116 to provide a linear change in the control fluid pressure conducted to the pump and motor actuator assemblies 50 and 56 with movement of the valve spool 428a.

Of course, during reverse operation of the hydrostatic transmission 14, the combination orifice and check valve assembly 482a is actuated from the open condition of FIG. 5 to the closed condition to restrict the flow of control fluid to the pump and motor actuator assemblies 50 and 56. The combination orifice and check valve assembly 480a is open during reverse operation of the hydrostatic transmission 14 to bypass control fluid around the orifice 502a. Although the valve 530 has been described herein as a steering control valve, it is contemplated that the valve could be utilized in a different environment to provide a modulated pressure output.

Linear Variation in Turning Radius With Steering Valve Actuation

The operational control of a vehicle is facilitated if the steering control valve has an effective operation range with at least 75% of its extent between a condition in which both tracks of the vehicle are driven at the same speed and a dead track condition in which one of the tracks is not being driven. By having a relatively large portion of the valve operating range preferably 90%, between the initial and dead track conditions, operator "feel" for steering the vehicle and control of the vehicle is enhanced. In addition, the steering control valve advantageously varies turning radius of the vehicle as a linear function of actuation of the steering control valve during at least a portion of the operating range of the steering control valve. This linear relationship enables the operator to vary the turning radius of the vehicle by incremental amounts each time the steering control valve is operated through a corresponding incremental amount. although the steering control valve 530 of FIGS. 5–7 varies the control fluid pressure conducted to the pump and motor actuator assemblies 50 and 56 as a linear function of the extent of operation of the valve 530, the turning radius of the vehicle varies quickly from a very large turning radius to a small turning radius, i.e. a radius of about 10 feet. The turning radius then varies linearly until a dead track condition is obtained.

Figure 11:
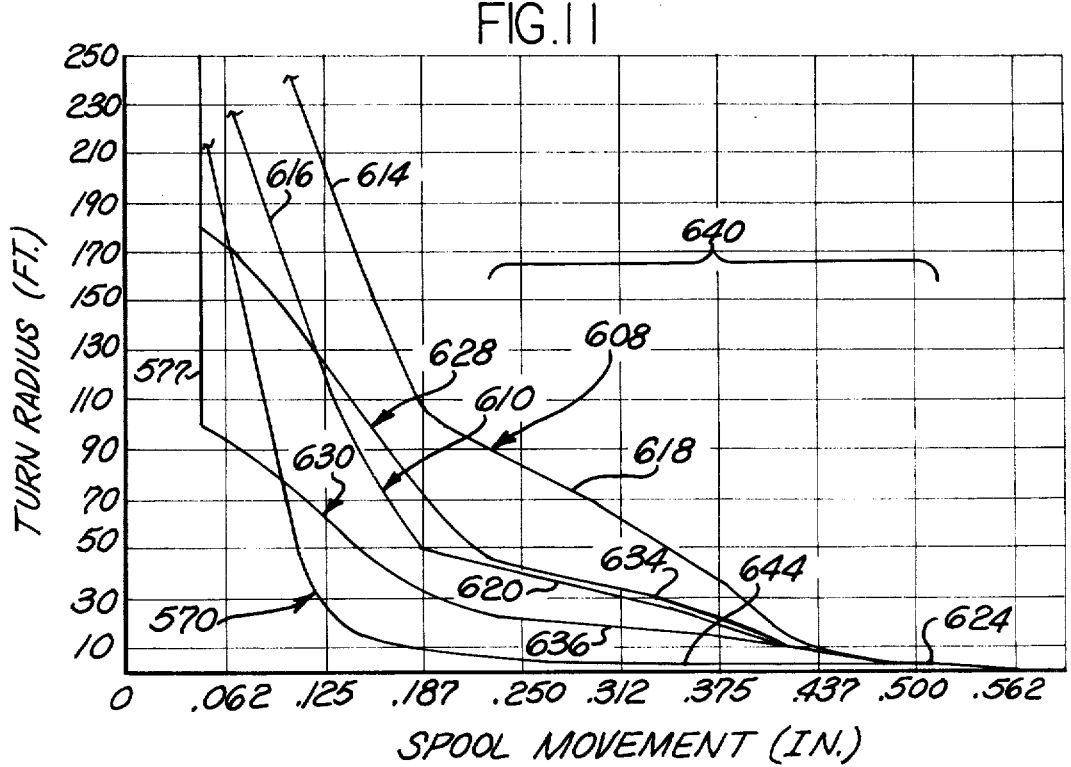
FIG. 11 is a graph illustrating the relationship between the valve spool movement for the valves of FIGS. 6 and 8 and changes in turning radius.

The relationship between variations in turning radius and variations in the extent of operation of the valve 530 is illustrated by the curve 570 of FIG. 11. Thus, upon initial movement of the valve spool 428a from the unactuated position of FIG. 5 through about 0.187 inches toward the intermediate position of FIG. 6, the turning radius of the vehicle changes sharply from an infinitely large turning radius to a relatively small turning radius of somewhat less than 10 feet. Continued movement of the valve spool 124a through a total distance of 0.350 inches results in the turning radius moving through 6 feet so that the center about which the vehicle is turning intersects the inside track. It should be noted that the curves of FIG. 11 are for a vehicle having a 74 inch gage track. Therefore half of the valve spool movement results in the turning radius being decreased by only an amount which is approximately equal to the distance between the centers of the tracks. Continued actuation of the valve steering control valve 530 results in a reversal of the direction in which the associated track of the vehicle is driven and a spinning of the vehicle about its center when the valve has been actuated through approximately 0.562 inches.

The nonlinear relationship between the variation in the extent to which the steering control valve 530 is actuated and the change of turning radius results from the fact that there is a linear relationship between variations in the extent to which the steering valve 530 is actuated and changes in the output speed of the hydrostatic transmission 14. In order to provide a linear relationship between the extent to which a steering control valve is actuated and changes in turning radius, it is necessary to provide a nonlinear relationship between variations in the extent to which the steering valve is actuated and variations in the speed of the associated hydrostatic transmission and vehicle track. This is because the outside track of the vehicle is driven at a constant speed as the vehicle is turning while the speed of the inside track is decreased. As the steering control valve is operated through incremental distances and the center about which the vehicle is turning moves closer to the inside track of the vehicle, it is necessary to decrease the speed of the outside track by increasingly larger increments in order to provide a linear relationship between changes in the extent of operation of the steering control valve and changes in turning radius.

The steering control valve 576 is constructed in accordance with one important aspect of the present invention and is operable to vary control fluid pressure as a nonlinear function of valve spool movement. The valve spool is provided with orifices which effect a change in turning radius from an infinite initial turning radius, indicated by the line 577 in FIG. 11, to dead track turning radius upon movement of the valve spool through slightly more than 90% of its total range of effective movement. Continued movement of the valve spool through less than 10% of its total range of movement results in a reversal of the direction in which a track of the vehicle is driven and a spinning of the vehicle about its vertical central axis.

In addition, the orifices in the valve spool are constructed so as to provide for a linear change in turning radius with valve spool movement through a major portion of the range between the initial condition and the dead track turning condition. Since the steering control valve 576 is constructed in the same general manner as are the steering control valves 46 and 530, similar numerals will be utilized to designate the components of the steering control valve 576, the suffix letter b being associated with the components of the steering control valve 576 to avoid confusion.

When the steering control valve 576 is in the unactuated or initial position of FIG. 8 and the vehicle 10 is being operated in a forward direction, control fluid pressure in the conduit 114 is transmitted through the orifice 502b in the orifice and check valve assembly 480b, valve chamber 424b, and conduit 120 to the pump and motor actuator assemblies 50 and 56. Similarly, fluid is conducted through the conduit 118, opening 446b in the valve spool 428b, longitudinally extending central passage 444b, an outlet opening 450b and an orifice and check valve assembly 482b to a conduit 116 leading to the speed control valve 42. At this time the track 22 (FIG. 1) is driven at the same speed as the track 24.

Upon movement of the valve spool 428b through approximately 90% of its total operating range to a partially actuated or intermediate position, relatively high pressure fluid conduits 114 and 120 are connected in fluid communication with the relatively low fluid pressure conduits 116 and 118. This reduces the fluid pressure conducted to the pressure responsive secondary motors in the pump and motor actuator assemblies 50 and 56 to zero or drain pressure. The spring assemblies in the pump actuator assembly 50 is then effective to move the swashplate 10 of the pump unit 28 (FIG. 2) to its neutral position. The hydrostatic transmission 14 is then ineffective to drive the track 22 and dead track turning of the vehicle results.

Initiating movement of the valve spool 428b through the remaining 10% of its effective stroke results in high pressure control fluid being conducted from the conduit 114 through space 470b between the valve lands 432b and 434b to the conduit 118 while the conduit 120 is connected with the drain conduit 116 by the space between the valve lands 434b and 534b. This causes the actuator assembly 50 to reverse the direction of operation of the hydrostatic transmission 14 and the direction in which the track 22 is driven. When the valve spool 428b reaches the end of its effective stroke, the track 22 is being driven in the reverse direction at the same speed at which the track 24 is driven in the forward direction to effect a spinning of the vehicle 10.

To provide for a nonlinear variation of control fluid pressure with variations in movement of the valve spool 428b and a linear variation in turning radius with movement of the valve spool 428b, orifices 580 are provided in the land 432b of the valve spool 428b (see FIGS. 8 and 9). Although only one of the orifices 580 is shown, it should be understood that there are a pair of orifices located in opposite portions of the valve land 432b. The orifice 580 (FIG. 9) is connected in fluid communication with exterior surfaces of the valve land 432b by passages 584 and 586.

When the valve spool 428b is in the unactuated or initial position of FIG. 8, the valve housing 426b blocks fluid flow through the passage 584. However, after initial movement of the valve spool 428b partially clear the valve land 432 from a valve seat 590, high pressure control fluid is conducted from the area 470b between the lands 432b and 434b through the passage 586, orifice 580, and passage 584 to the conduit 118. This results in the high pressure fluid conduits 114 and 120 being connected in fluid communication with the relatively low pressure conduits 116 and 118 to thereby initiate a reduction in the control fluid pressure conducted to the pump and motor actuator assemblies 50 and 56. As the valve spool 428b continues to move from the unactuated position of FIG. 8 toward an intermediate actuated position similar to the position shown in FIG. 6 for the valve spool 428a, an undercut 544b becomes effective to enable the flow around the land 432b.

The combined effect of the orifice 580 and the undercut 544b results in a nonlinear variation of control fluid pressure with and a linear variation in turning radius movement of the valve spool 428b. Thus in one specific embodiment of the invention having a pair of relatively small orifices 580, the control fluid pressure varies in the manner illustrated by the curve 600 in FIG. 10 with movement of the valve spool 428b. When the size of the orifices 580 was increased, the control fluid pressure varied in a manner illustrated by the curve 602 in FIG. 10. It should be noted that in both embodiments the effective operating range of the valve spools started at approximately 0.046 inches and extended through a dead track turning condition at approximately 0.516 inches to a final position at 0.562 inches of movement.

This nonlinear variation in the control fluid pressure conducted to the actuators 50 and 56 results in a relatively large rate of initial change in the turning radius so that the center of turning moves quickly from an extremely large radius to a moderate radius of between 20 and 110 feet upon actuation of the steering valve in order to avoid a dead pedal feeling. Continued actuation of the steering control valve 576 results in a substantially linear relationship between the extent to which the valve spool 428*b* is moved and variations in turning radius. Thus when the embodiment of the steering control valve 576 having the relatively small diameter orifices 580 was subjected to a moderate control fluid pressure, the turning radius varied as a function of movement of the valve spool 428*b* in a manner indicated by the curve 608 in FIG. 11. When the same valve spool 428*b* having small diameter orifice 580 was subjected to a somewhat higher control fluid pressure, the turning radius varied with valve spool movement in a similar manner depicted by the curve 610 in FIG. 11.

It should be noted that with both the moderate and high control fluid pressure a rapid change in turning radius occured upon initial movement of the valve spool 428*b*. This rapid change is indicated by the steeply sloping portions 614 and 616 of the curves 608 and 610. The rapid change in turning radius ends after the valve spool 428*b* has been moved through about 0.187 inches.

After this rapid change had taken place, the linear portions 618 and 620 of the curves 608 and 610 indicate a linear change of turning radius with valve spool movement until the center upon which the vehicle is turning intersects a track of the vehicle. At that time the hydrostatic transmission 14 is ineffective to drive the track 22 and there is a dead track turning of the vehicle, this point being indicated by numeral 624 in FIG. 11 and occurs after the valve spool 428*b* has been moved through a total distance of approximately 0.516 inches from its initial position. Continued actuation of the valve spool 428*b* results in a reversal of the direction of movement of the track 22 and a continued reduction of the turning radius until the vehicle 10 has a zero turning radius and is spinning about its center. This occurs when the valve spool has moved through a total distance of 0.562 inches.

Curve 628 depicts how the turning radius changes with valve spool movement when there is a relatively moderate control fluid pressure and the valve spool orifices 580 have a relatively large diameter. Similarly when there is a relatively high fluid pressure, the turning radius varies with valve spool movement in the manner indicated by the curve 630 in FIG. 11 when the valve spool is provided with a relatively large diameter orifice. Both of the curves 628 and 630 have linear portions 634 and 636 which indicate a linear change of turning radius with valve spool movement and correspond to the linear portions 618 and 620 of the curves 608 and 609. Thus, although it can be seen that the specific manner in which the turning radius varies with valve spool movement depends upon the control fluid pressure which is present and the diameter of the orifices 580 in the spool, the turning radius varies in a linear manner with valve spool movement through a major portion of the range of valve spool movement as indicated by the bracket 640 in FIG. 11.

The curve 570 depicting the change in turning radius for the valve 530 also changes in a linear manner through a large portion of the range of valve spool movement. However, the curve 570 quickly falls off to a very small turning radius of less than ten feet and then decreases at an extremely slow rate. Therefore, when a vehicle operator actuates the valve 530 the turning radius changes quickly to almost a dead track turn, which occurs at the point designated at 644 in FIG. 11. Since the turning radius of the vehicle changes quickly from a large turning radius to a very small turning radius, the operator of the vehicle may have difficulty in controlling the vehicle when steering at certain turning radii.

When the steering valve 576 is utilized in a vehicle having tracks 22 and 24 with longitudinal axes 558 and 648 spaced apart by a distance of about 6 feet, actuation of the steering control valve 576 quickly decreases the turning radius which is more than twice the distance between the longitudinal axes 558 and 648, that is more than 12 feet, outwardly from the longitudinal axis 558 of the track 22. After this turning radius has been reached, the turning radius varies in linear manner with the movement of the valve spool through a major portion of its stroke. Thus the linear portion 618 of the curve 608 extends from a turning radius of more than 100 feet to a turning radius of 3 feet over a range of valve spool movement from approximately 0.190 to approximately 0,150. During this range of valve spool movement the turning radius varies in a generally linear manner with valve spool movement. Similarly, the linear portion of the curve 630 extends from a turning radius of approximately 20 feet when the valve spool has been moved through about 0.240 inches to a turning radius of approximately 3 feet, when the valve spool has been moved by 0.510 inches. Thus with both relatively large and small diameter orifices 580 and high and low control fluid pressure, the turning radius for the valve 576 decreases linearly from a turning radius which is spaced outwardly from the longitudinal axis 558 of the track 22 by a distance of more than twice the distance between the tracks, that is twelve feet, to a dead track turn. This change in turning radius occurs gradually over a major portion of the stroke of the steering control valve 428*b*.

Summary:

From the foregoing, it can be seen that the displacement and input to output speed ratios of the hydrostatic transmissions 14 and 16 are simultaneously varied by operating a single pressure controller type speed control valve 42. Separate steering control valves 46 and 48 are associated with each of the hydrostatic transmissions. These steering control valves are connected in fluid communication with each other and with the speed control valve 42 by the fluid conduits 114 and 116.

Upon operation of one of the steering control valves 46 or 48, the pump and motor assemblies 50 and 56 or 52 and 58 are activated to vary the output speed of the associated hydrostatic transmission and the speed at which one of the tracks 22 or 24 is driven. Combination orifice and check valve or flow control assemblies 480, 482, 484 and 486 are associated with the steering control valves 46 and 48 to enable one of the steering control valves to be actuated to vary the input to output speed ratio of the associated hydrostatic transmission while maintaining the input to output speed ratio of the other hydrostatic transmission constant. Each of the flow control assemblies 480, 482, 484 and 486 includes an orifice 502 for restricting fluid flow to the associated actuator assembly and a check valve 488 which enables the fluid to flow freely from the associated actuator assembly to the speed control valve 42 and drain. Although the combination orifice and check valve assemblies 480, 482, 484 and 486 shown are constructed integrally with an associated one of the steering control valves, it is contemplated that the combination orifice and check valve assemblies could be separated from the steering control valves. It is also contemplated that the steering control valves and combination orifice and check valve assemblies could be utilized to activate pressure responsive devices other than the pump and motor actuator assemblies 50, 52, 56 and 58.

In one specific preferred embodiment of the invention, the steering control valve 576 is operable to vary the turning radius of the vehicle 10 as a linear function of variations in the extent of operation of the steering control valve. As the steering control valve is operated an initial postion, the associated hydrostatic transmission 14 drives the track 22 to the vehicles at a decreased speed to effect a turning of the vehicle about a center. As the steering control valve is moved from a condition in which the vehicle is turning about a center disposed outwardly of the track 22 by a distance which is at least twice as great as the spacing between the longitudinal axes 558 and 648 of the tracks, the turning radius decreases as a linear function variations in valve spool movement. The range of the valve spool movement for which the linear decrease in turning radius occurs is a major portion of the distance through which the valve spool is moved from an unactuated condition to a condition in which the vehicle 10 is turning about the track 22. When the steering control valve spool 428b has moved through at least 75% and preferably 90% of its total effective operating range, the hydrostatic transmission 14 is ineffective to drive the track 22 and dead track turning results. Movement of the valve spool 428b through no more than 25% and preferably about 10% of its total range of movement causes a spinning of the vehicle about its vertical central axis. By providing the large majority of valve spool movement between the initial and the dead track actuated positions, operator feel and control of the vehicle is enhanced. During movement of the valve spool from the dead track turning position to its final position, the vehicle is spinning and operator feel is not as important for satisfactory vehicle control.

Although steering control valves 46, 48, 530 and 576 and the combination orifice and check valve assemblies 580, 582, 584 and 586 have been described herein in association with specific actuator assemblies, such as the actuator assemblies 50 and 56 for the pump and motor units 28 and 32, it is contemplated that the steering control valves and the combination orifice and check valve assemblies will be associated with other types of actuator assemblies. In addition, although the steering control valves are advantageously associated with a pressure regulator type speed control valve 42, it is contemplated that they may, under certain circumstances, be associated with other types of speed control valves.

Having described specific preferred embodiments of the invention, the following is claimed:

1. An apparatus comprising a plurality of hydrostatic transmissions having pump and motor units, first actuator means for varying the effective displacement of at least one unit of one of the hydrostatic transmissions in response to a variation in fluid pressure conducted to said first actuator means, second actuator means for varying the effective displacement of at least one unit of another one of the hydrostatic transmissions in response to a variation in fluid pressure conducted to said second actuator means, first, valve means for varying the fluid pressure conducted to said first actuator means to enable the displacement of the one hydrostatic transmission to be varied while maintaining the displacement of the other hydrostatic transmission constant, second valve means for varying the fluid pressure conducted to said second actuator means to enable the displacement of the other hydrostatic transmission to be varied while maintaining the displacement of the one hydrostatic transmission constant, first conduit means connnected in fluid communication with said first and second valve means and a source of fluid pressure for conducted fluid pressure to said first and second valve means from the source of fluid pressure, second conduit means connected in fluid communication with said first valve means and said first actuator means for conducting fluid to and from said first actuator means, third conduit means connected in fluid communication with said second valve means and said second actuator means for conducting fluid to and from said second actuator means, said first valve means including first flow control means for restricting fluid flow from said first conduit means through said first valve means to said second conduit means to maintain the fluid pressure conducted to said second valve means by said first conduit means substantially constant upon operation of said first valve means to thereby enable the displacement of the one hydrostatic transmission to be varied while maintaining the displacement of the other hydrostatic transmission constant, said first flow control means further including means for enabling fluid to flow in an unrestricted manner from said first actuator means through said second conduit means, said second valve means including second flow control means for restricting fluid flow from said first conduit means through said second valve means to said third conduit means and said second actuator means to maintain the fluid pressure in said first conduit means substantially constant upon operation of said second valve means to thereby enable the displacement of the other hydrostatic transmission to be varied while maintaining the displacement of the one hydrostatic transmission constant, said second flow control means further including means for enabling fluid to flow in an unrestricted manner from said second actuator means through said third conduit means.

2. An apparatus as set forth in claim 1 wherein said first and second flow control means include second and third orifice means for restricting fluid flow through said first and second conduit means toward the associated one of said actuator means and first and second bypass valve means for bypassing fluid from the associated one of said actuator means around the associated one of said orifice means.

3. An apparatus as set forth in claim 1 wherein said first and second flow control means each include a valve member biased toward a closed position under the influence of control fluid pressure conducted to the associated one of said actuator means, said valve member being movable from the closed position to an open position under the influence of fluid flow from the associated one of said actuator means.

4. An apparatus as set forth in claim 3 wherein said valve member includes means for defining an orifice through which control fluid can flow to the associated one of said actuator means when said valve member is in the closed position.

5. An apparatus as set forth in claim 1 wherein said first and second flow control means include first check valve means for at least partially blocking fluid flow through said second conduit means to said first actuator means and second check valve means for at least partially blocking fluid flow through said third conduit means to the said second actuator means.

6. An apparatus as set forth in claim 1 further including pressure controller means connected in fluid communication with said first conduit means and operable to any one of a plurality of settings to simultaneously vary control fluid pressure conducted through said second conduit means to said first actuator means and through said third conduit means to said second actuator means in accordance with variations in the setting of said pressure controller means.

7. An apparatus as set forth in claim 1 wherein said second conduit means includes a first passage means for conducting fluid pressure from said first valve means to said first actuator means during operation of said one hydrostatic transmission in a forward direction and for conducting relatively low fluid pressure from said first valve means to said actuator means during operation of said one hydrostatic transmission in a reverse direction opposite from said forward direction and second passage means for conducting fluid pressure from said first valve means to said first actuator means during operation of said one hydrostatic transmission in the reverse direction and for conducting relatively low fluid pressure from said first valve means to said first actuator means during operation of said one hydrostatic transmission in the forward direction, said first flow control means including first orifice means for restricting the flow of control fluid from said first valve means through said first passage means to said first actuator means, a first bypass passage connected in fluid communication with opposite sides of said first orifice means, and first check valve means for blocking fluid flow toward said first actuator means through said first bypass passage and for enabling fluid to flow from said first actuator means through said first bypass passage, said second flow control means including second orifice means for restricting the flow of fluid from said first valve means through said second passage means to said first actuator means, a second bypass passage connected in fluid communication with opposite sides of said second orifice means, and second check valve means for blocking fluid flow toward said first actuator means through said second bypass passage and for enabling fluid to flow from said first actuator means through said second bypass passage.

8. An apparatus as set forth in claim 7 further including pressure controller means connected in fluid communication with said first and second passage means and operable to any one of a plurality of settings to vary the control fluid pressure conducted through one of said passage means to said first actuator means.

9. An apparatus as set forth in claim 1 wherein said apparatus furher includes first output means associated with said first hydrostatic transmission for driving a first track of a vehicle and second output means associated with said second hydrostatic transmission for driving a second track of the vehicle, said first and second valve means each including a movable valve actuator member and means for varying the fluid pressure conducted to the associated one of said actuator means as a nonlinear function of movement of the associated actuator member and for varying the turning radius of the vehicle as a linear function of movement of the associated actuator member.

10. An apparatus comprising first and second reversible hydrostatic transmissions having a variable displacement pump units, first actuator means for varying the input to output speed ratio of said first hydrostatic transmission during forward and reverse operation of said first hydrostatic transmission, second actuator means for varying the input to output speed ratio of said second hydrostatic transmission during forward and reverse operation of said second hydrostatic transmission, master control valve means for effecting operation of said first and second actutator means to simultaneously vary the input to output speed ratios of said first and second hydrostatic transmissions during forward and reverse operation of said first and second hydrostatic transmissions, first steering valve means for effecting operation of said first actuator means to vary the input to output speed ratio of said first hydrostatic transmission during forward and reverse operation of said first hydrostatic transmission, second steering valve means for effecting operation of said second actuator means to vary the input to output speed ratio of said second hydrostatic transmission during forward and reverse operation of said second hydrostatic transmission, first conduit means for conducting control fluid pressure from said master control valve means to said first steering control valve means and from said first steering control valve means to said first actuator means during forward operation of said first hydrostatic transmission and for connecting said first actuator means in fluid communication with low pressure fluid during reverse operation of said first hydrostatic transmission, second conduit means for conducting control fluid pressure from said master control valve means to said first steering control valve means and from said first steering control valve means to said first actuator means during reverse operation of said first hydrostatic transmission and for connecting said first actuator means in fluid communication with low pressure fluid during forward operation of said first hydrostatic transmisson, third conduit means connected in fluid communication with said first conduit means for conducting control fluid pressure from said master control valve means to said second steering control valve means and from said second steering control valve means to said second actuator means during forward operation of said second hydrostatic transmission and for connecting said second actuator means in fluid communication with low pressure fluid during reverse operation of said second hydrostatic transmission, fourth fluid conduit means connected in fluid communication with said second fluid conduit means for conducting control fluid pressure from said master control valve means to said second steering control valve means and from said second steering control valve means to said second actuator means during reverse operation of said second hydrostatic transmission and for connecting said second actuator means in fluid communication with low pressure fluid during forward operation of said second hydrostatic transmission, said first steering control valve means being actuatable to port control fluid pressure from said first conduit means to said second conduit means during forward operation of said first hydrostatic transmission and to port control fluid pressure from said second conduit means to said first conduit means during reverse operation of said first hydrostatic transmission to thereby effect operation of said first actuator means to vary the input to output speed ratio of said first hydrostatic transmission, said second steering control valve means being actuatable to port control fluid pressure from said third conduit means to said fourth conduit means during forward operation of said second hydrostatic transmission and to port control fluid pressure from said fourth conduit means to said third conduit means during reverse operation of said second hydrostatic transmission to thereby effect operation of said second actuator means to vary the input speed ratio of said second hydrostatic transmission, first orifice means for restricting the flow of control fluid from said first conduit means to said second conduit means upon actuation of said first steering control valve means during operation of said first hydrostatic transmission in the forward direction to prevent excessive fluid flow from said third conduit means to said first conduit means and operation of said second actuator means, second orifice means for restricting the flow of control fluid from said second conduit means to said first conduit means upon actuation of said first control valve means during operation of said first hydrostatic transmission in the reverse direction to prevent excessive fluid flow from said fourth conduit means to said second conduit means and operation of said second actuator means, third orifice means for restricting the flow of control fluid from said third conduit means to said fourth conduit means upon actuation of said second steering control valve means during operation of said second hydrostatic transmission in the forward direction to prevent excessive fluid flow from said first conduit means to said third conduit means and operation of said first actuator means, and fourth orifice means for restricting the flow of control fluid from said fourth conduit means to said third conduit means upon actuation of said second steering control valve means during operation of said second hydrostatic transmission in the reverse direction to prevent excessive fluid flow from said second conduit means to said fourth conduit means and operation of said first actuator means.

11. An apparatus as set forth in claim 10 further including a plurality of bypass passages each of which is connected in fluid communication with opposite sides of an associated one of said orifice means, a plurality of check valve means each of which is associated with one of the bypass passages for blocking fluid flow through the associated bypass passage toward one of aid actuator means and for enabling fluid to flow away from one of said actuator means throught the associated bypass passage.

12. An apparatus as set forth in claim 11 further including first means associated with said first hydrostatic transmission for driving a first track of a vehicle, second means associated with said second hydrostatic transmission for driving a second track of a vehicle, said first and second steering control valve means each including a movable valve actuator member and means for varying the control fluid pressure conducted to the associated one of said actuator means as a nonlinear function of movement of the associated actuator member and for varying the turning radius of the vehicle as a linear function of movement of the associated actuator member.

13. An apparatus as set forth in claim 10 wherein said master control valve means includes means for connecting said first and third conduit means in fluid communication with a source of control fluid under pressure and said second and fourth conduit means in fluid communication with a source of low pressure fluid upon operation of said master control valve means in a first direction and for connecting said second and fourth conduit means in fluid communication with a source of control fluid under pressure and said first and third conduit means in fluid communication with a source of low pressure fluid upon operation of said master control valve means in a second direction.

14. An apparatus as set forth in claim 13 wherein said master control valve means is operable to any one of a plurality of settings to simultaneously vary the control fluid pressure conducted through said first and third conduit means during forward operation of said first and second hydrostatic transmissions and to simultaneously vary the control fluid pressure conducted through said second and fourth conduit means during reverse operation of said first and second hydrostatic transmissions.

15. An apparatus comprising a plurality of hydrostatic transmissions having pump and motor units, first actuator means for varying the effective displacement of at least one unit of one of the hydrostatic transmissions in response to a variation in fluid pressure conducted to said first actuator means, second actuator means for varying the effective displacement of at least one unit of another one of the hydrostatic transmissions in response to a variation in fluid pressure conducted to said second actuator means, first valve means for varying the fluid pressure conducted to said first actuator means to enable the displacement of the one hydrostatic transmission to be varied, second valve means for varying the fluid pressure conducted to said second actuator means to enable the displacement of the other hydrostatic transmission to be varied, first conduit means connected in fluid communication with said first and second valve means and a sourse of fluid pressure for conducting fluid pressure to said first and second valve means from the source of control fluid pressure, second conduit means connected in fluid communication with said first valve means and said first actuator means for conducting to and from said first actuator means, third conduit means connected in fluid communication with said second valve means and said second actuator means for conducting fluid to and from said second actuator means, said first valve means being operable from a first condition connecting said first and second fluid conduit means in fluid communication to a second conditon to effect a flow of fluid from said first conduit means to said second conduit means and operation of said first actuator means to vary the displacement of said first hydrostatic transmission, said second valve means being operable from a first condition connecting said first conduit means in fluid communication with said third conduit means to a second condition to effect a flow of fluid from said first conduit means to said third conduit means and operation of said second actuator means to vary the displacement of said second hydrostatic transmission, said first valve means including first flow control means for restricting fluid flow from said first conduit means through said first valve means to said second conduit means upon operation of said first valve means from its first condition to its second condition with said second valve means in its first condition to maintain the fluid pressure conducted to said second valve means by said first conduit means substantially constant upon operation of said first valve means to thereby enable the displacement of the one hydrostatic transmission to be varied while maintaining the displacement of the other hydrostatic transmission constant, said first flow control means further including means for enabling fluid to flow in an unrestricted manner from said first actuator means through said second conduit means, said second valve means including second slow control means for restricting fluid flow from said first conduit means through said second valve means to said third conduit means upon operation of said second valve means from its first condition to its second condition with said first valve means in its first condition to maintain the control fluid pressure conducted to said first valve means by said first conduit means substantially constant upon operation of said second valve means to thereby enable the displacement of the other hydrostatic transmission to be varied while maintaining the displacement of the one hydrostatic transmission constant, said second flow control means further including means for enabling fluid to flow in an unrestricted manner from said second actuator means through said third actuator means.

16. An apparatus as set forth in claim 15 further including pressure controller means connected in fluid communication with said first conduit means and operable to any one of a plurality of settings to simultaneously vary fluid pressure conducted through said second conduit means to said first actuator means and through said third conduit means to said second actuator means in accordance with variations in the settings of said pressure controller means when said first and second valve means are in their first conditions.

17. An apparatus comprising a plurality of hydrostatic transmissions having pump and motor units, first actuator means for varying the effective displacement of at least one unit of one of the hydrostatic transmissions in response to a variation in control fluid pressure, second actuator means for varying the effective displacement of at least one unit of another one of the hydrostatic transmissions in response to a variation in control fluid pressure, first conduit means for conducting control fluid to and from said first actuator means, second conduit means connected in fluid communication with said first conduit means for conducting control fluid to and from said second actuator means, first valve means for varying the control fluid, pressure conducted to said first actuator means while maintaining the control fluid pressure conducted to said second actuator means substantially constant to enable the displacement of the one hydrostatic transmission to be varied while maintaining the displacement of the other hydrostatic transmission constant, said first valve means including first flow control means for restricting fluid flow to said first actuator means through said first conduit means and for enabling fluid to flow in an unrestricted manner from said first actuator means through said first conduit means, second valve means for varying the control fluid pressure conducted to said second actuator means while maintaining the control fluid pressure conducted to said first actuator means substantially constant to enable the displacement of the other hydrostatic transmission to be varied while maintaining the displacement of the one hydrostatic transmission constant, said second valve means including second flow control means for restricting fluid flow to said second actuator means through said second conduit means and for enabling fluid to flow in an unrestricted manner from said second actuator means through said second conduit means, first output means associated with said first hydrostatic transmission for driving a first track of a vehicle and second output means associated with said second hydrostatic transmission for driving a second track of the vehicle, said first and second valve means each including a movable valve actuator member and means for varying the control fluid pressure conducted to the associated one of said actuator means as a nonlinear function of movement of the associated actuator member and for varying the turning radius of the vehicle as a linear function of movement of the associated actuator member.

* * * * *